(12) United States Patent
Ensworth et al.

(10) Patent No.: US 10,863,682 B2
(45) Date of Patent: Dec. 15, 2020

(54) WIRELESS IRRIGATION CONTROL

(71) Applicant: Rain Bird Corporation, Azusa, CA (US)

(72) Inventors: Mark M. Ensworth, Orange, CA (US); Barbara E. Booth, Tucson, AZ (US); Dean C. Thornton, Alpine, CA (US); Randall A. Hern, San Diego, CA (US); Malcolm N. Napier, San Diego, CA (US)

(73) Assignee: Rain Bird Corporation, Azusa, CA (US)

( * ) Notice: Subject to any disclaimer, the term of this patent is extended or adjusted under 35 U.S.C. 154(b) by 0 days.

(21) Appl. No.: 16/229,596

(22) Filed: Dec. 21, 2018

(65) Prior Publication Data

US 2019/0116743 A1     Apr. 25, 2019

Related U.S. Application Data

(60) Continuation of application No. 15/077,813, filed on Mar. 22, 2016, now Pat. No. 10,194,599, which is a
(Continued)

(51) Int. Cl.
| | |
|---|---|
| *A01G 25/16* | (2006.01) |
| *G05B 19/18* | (2006.01) |
| *H04W 88/00* | (2009.01) |

(52) U.S. Cl.
CPC .............. *A01G 25/16* (2013.01); *G05B 19/18* (2013.01); *H04W 88/00* (2013.01);
(Continued)

(58) Field of Classification Search
CPC ........ G05B 19/18; H04W 88/00; A01G 25/16
See application file for complete search history.

(56) References Cited

U.S. PATENT DOCUMENTS

| | | |
|---|---|---|
| D208,451 S | 8/1967 | Anesi |
| 3,653,595 A | 4/1972 | Greengard, Jr. |

(Continued)

FOREIGN PATENT DOCUMENTS

| | | |
|---|---|---|
| CA | 119116 | 2/2008 |
| EM | 0006591640001 | 1/2007 |

(Continued)

OTHER PUBLICATIONS

EPO; App. No. 06787841.3; Extended European Search Report dated Jul. 12, 2013.
(Continued)

*Primary Examiner* — Ronald D Hartman, Jr.
(74) *Attorney, Agent, or Firm* — Fitch, Even, Tabin & Flannery LLP

(57) ABSTRACT

Several embodiments provide wireless irrigation control and related methods. In one implementation, an irrigation control system includes a transmitter unit including a controller and a connector to be coupled to an irrigation controller having station actuation output connectors. The controller is can receive an indication that the irrigation controller has activated an irrigation station, and can cause the transmitter unit to transmit a wireless activation signal responsive to the indication. A receiver unit is coupled to an actuator coupled to an actuatable device, such as an irrigation valve, the actuator configured to actuate the irrigation valve to control the flow of water therethrough. The receiver unit receives the wireless activation signal and in response, causes the actuator to actuate the actuatable device.

20 Claims, 26 Drawing Sheets

Related U.S. Application Data continuation of application No. 14/490,500, filed on Sep. 18, 2014, now Pat. No. 9,320,205, which is a continuation of application No. 13/934,161, filed on Jul. 2, 2013, now Pat. No. 8,868,246, which is a continuation of application No. 13/475,863, filed on May 18, 2012, now Pat. No. 8,504,210, which is a continuation of application No. 12/464,818, filed on May 12, 2009, now Pat. No. 8,185,248, which is a division of application No. 11/458,535, filed on Jul. 19, 2006, now Pat. No. 7,558,650.

(60) Provisional application No. 60/701,436, filed on Jul. 19, 2005.

(52) U.S. Cl.
CPC ....... *G05B 2219/2625* (2013.01); *Y02A 40/22* (2018.01); *Y10T 137/189* (2015.04); *Y10T 137/1866* (2015.04)

(56) References Cited

U.S. PATENT DOCUMENTS

| | | | |
|---|---|---|---|
| 3,726,477 A | 4/1973 | Shapiro | |
| 3,747,620 A | 7/1973 | Kah, Jr. | |
| 4,146,049 A | 3/1979 | Kruse | |
| 4,185,650 A | 1/1980 | Neves | |
| 4,209,131 A | 6/1980 | Barash | |
| 4,244,022 A | 1/1981 | Kendall | |
| 4,256,133 A | 3/1981 | Coward | |
| 4,333,490 A | 6/1982 | Enter | |
| 4,396,149 A | 8/1983 | Hirsch | |
| 4,541,563 A | 9/1985 | Uetsuhara | |
| 4,626,984 A | 12/1986 | Unruh | |
| 4,684,920 A | 8/1987 | Reiter | |
| 4,760,547 A | 7/1988 | Duxbury | |
| D298,962 S | 12/1988 | Bruninga | |
| 4,838,310 A | 6/1989 | Scott | |
| 4,852,802 A * | 8/1989 | Iggulden | A01G 25/167 239/64 |
| 4,937,746 A | 6/1990 | Brundisini | |
| 4,962,522 A | 10/1990 | Marian | |
| 5,048,755 A | 9/1991 | Dodds | |
| 5,074,468 A | 12/1991 | Yamamoto | |
| 5,173,855 A | 12/1992 | Nielsen | |
| 5,251,153 A | 10/1993 | Nielsen | |
| 5,333,785 A * | 8/1994 | Dodds | A01G 25/16 239/67 |
| 5,427,350 A | 6/1995 | Rinkewich | |
| 5,445,178 A | 8/1995 | Feuer | |
| 5,465,904 A | 11/1995 | Vaello | |
| 5,479,338 A | 12/1995 | Ericksen | |
| D368,230 S | 3/1996 | Cohen | |
| D377,316 S | 1/1997 | Roman | |
| 5,647,388 A | 7/1997 | Butler | |
| 5,696,671 A | 12/1997 | Oliver | |
| 5,740,031 A | 4/1998 | Gagnon | |
| 5,748,466 A | 5/1998 | McGivern | |
| 5,749,521 A | 5/1998 | Lattery | |
| 5,760,706 A | 6/1998 | Kiss | |
| 5,797,417 A | 8/1998 | DeLattre | |
| 5,813,606 A * | 9/1998 | Ziff | A01G 25/167 239/63 |
| 5,826,619 A | 10/1998 | Roman | |
| 5,859,536 A | 1/1999 | Stockton | |
| 5,870,302 A * | 2/1999 | Oliver | A01G 25/167 700/11 |
| 5,914,847 A | 6/1999 | Alexanian | |
| 5,921,280 A | 7/1999 | Ericksen | |
| 5,927,603 A | 7/1999 | McNabb | |
| D428,876 S | 8/2000 | Renkis | |
| 6,098,898 A | 8/2000 | Storch | |
| D431,195 S | 9/2000 | Clivio | |
| 6,173,727 B1 | 1/2001 | Davey | |
| D442,577 S | 5/2001 | Strand | |
| D442,947 S | 5/2001 | Warner | |
| 6,257,264 B1 | 7/2001 | Sturman | |
| 6,259,955 B1 | 7/2001 | Brundisini | |
| 6,259,970 B1 | 7/2001 | Brundisini | |
| 6,283,139 B1 | 9/2001 | Symonds | |
| 6,298,285 B1 * | 10/2001 | Addink | A01G 25/16 239/63 |
| 6,312,191 B1 | 11/2001 | Rosenfeld | |
| 6,335,855 B1 | 1/2002 | Alexanian | |
| 6,337,635 B1 | 1/2002 | Ericksen | |
| 6,437,692 B1 | 8/2002 | Petite | |
| 6,452,499 B1 | 9/2002 | Runge | |
| 6,453,215 B1 | 9/2002 | Lavoie | |
| 6,491,062 B1 | 12/2002 | Croft | |
| D477,287 S | 7/2003 | Roman | |
| 6,600,971 B1 | 7/2003 | Smith | |
| 6,633,786 B1 | 10/2003 | Majors | |
| 6,685,104 B1 | 2/2004 | Float | |
| D487,728 S | 3/2004 | Murray | |
| D492,264 S | 6/2004 | Perez | |
| 6,782,310 B2 | 8/2004 | Bailey | |
| 6,782,311 B2 | 8/2004 | Barlow | |
| 6,823,239 B2 | 11/2004 | Sieminski | |
| 6,853,883 B2 | 2/2005 | Kreikemeier | |
| 6,895,987 B2 | 5/2005 | Addink | |
| 6,904,926 B2 | 6/2005 | Aylward | |
| 7,010,394 B1 | 3/2006 | Runge | |
| 7,050,887 B2 | 5/2006 | Alvarez | |
| 7,069,115 B1 * | 6/2006 | Woytowitz | A01G 25/16 137/78.3 |
| 7,111,817 B2 | 9/2006 | Teti | |
| D535,571 S | 1/2007 | Simon | |
| 7,216,659 B2 | 5/2007 | Caamano | |
| D546,772 S | 7/2007 | Venegas | |
| 7,245,991 B1 | 7/2007 | Woytowitz | |
| 7,248,945 B2 | 7/2007 | Woytowitz | |
| 7,257,465 B2 | 8/2007 | Perez | |
| 7,261,245 B2 | 8/2007 | Zur | |
| 7,266,428 B2 | 9/2007 | Alexanian | |
| 7,286,904 B2 | 10/2007 | Graham | |
| 7,289,886 B1 | 10/2007 | Woytowitz | |
| 7,339,957 B2 | 3/2008 | Hitt | |
| 7,363,113 B2 | 4/2008 | Runge | |
| 7,398,139 B1 | 7/2008 | Woytowitz | |
| 7,406,363 B2 | 7/2008 | Doering | |
| 7,444,207 B2 | 10/2008 | Nickerson | |
| D581,880 S | 12/2008 | Neitzel | |
| D585,435 S | 1/2009 | Wafer | |
| 7,522,975 B2 | 4/2009 | Perez | |
| 7,558,650 B2 | 7/2009 | Thornton | |
| 7,613,546 B2 | 11/2009 | Nelson | |
| 7,613,547 B1 | 11/2009 | Woytowitz | |
| 7,640,079 B2 | 12/2009 | Nickerson | |
| 7,750,805 B2 | 7/2010 | Leggett | |
| D622,709 S | 8/2010 | Hern | |
| 7,789,321 B2 | 9/2010 | Hitt | |
| 7,809,475 B2 | 10/2010 | Kaprielian | |
| 7,844,369 B2 | 11/2010 | Nickerson | |
| 7,853,363 B1 * | 12/2010 | Porter | A01G 25/167 239/63 |
| 7,877,168 B1 | 1/2011 | Porter | |
| 7,883,027 B2 | 2/2011 | Fekete | |
| 7,899,580 B2 | 3/2011 | Cardinal | |
| 7,912,588 B2 | 3/2011 | Runge | |
| 7,916,458 B2 | 3/2011 | Nelson | |
| 7,917,249 B2 | 3/2011 | Jacobsen | |
| 7,930,069 B2 | 4/2011 | Savelle | |
| 7,937,187 B2 | 5/2011 | Kaprielian | |
| 7,949,433 B2 | 5/2011 | Hern | |
| 7,953,517 B2 | 5/2011 | Porter | |
| 7,957,843 B2 | 6/2011 | Sacks | |
| 7,962,244 B2 | 6/2011 | Alexanian | |
| 7,962,245 B2 | 6/2011 | Runge | |
| 7,996,115 B2 | 8/2011 | Nickerson | |
| 8,010,238 B2 | 8/2011 | Ensworth | |
| 8,013,732 B2 | 9/2011 | Petite | |
| 8,014,904 B1 | 9/2011 | Woytowitz | |

(56) References Cited

U.S. PATENT DOCUMENTS

| | | | |
|---|---|---|---|
| 8,019,482 B2 | 9/2011 | Sutardja | |
| 8,024,075 B2 | 9/2011 | Fekete | |
| 8,055,389 B2 | 11/2011 | Holindrake | |
| 8,104,993 B2 | 1/2012 | Hitt | |
| 8,160,750 B2 | 4/2012 | Weiler | |
| 8,185,248 B2 | 5/2012 | Ensworth | |
| 8,326,440 B2 | 12/2012 | Christfort | |
| 8,504,210 B2 | 8/2013 | Ensworth | |
| 8,615,329 B2 | 12/2013 | O'Connor | |
| 8,620,481 B2 | 12/2013 | Holindrake | |
| 8,868,246 B2 | 10/2014 | Thornton | |
| 9,244,449 B2 | 1/2016 | Tennyson | |
| 9,320,205 B2 | 4/2016 | Ensworth | |
| 1,019,459 A1 | 2/2019 | Ensworth | |
| 10,201,133 B2 | 2/2019 | Tennyson et al. | |
| 2002/0002425 A1 | 1/2002 | Dossey | |
| 2002/0071234 A1 | 6/2002 | Alexanian | |
| 2002/0092926 A1 | 7/2002 | Thornton | |
| 2002/0105437 A1* | 8/2002 | Pollak | A01G 25/092 340/870.28 |
| 2003/0093159 A1* | 5/2003 | Sieminski | A01G 25/167 700/12 |
| 2003/0109964 A1 | 6/2003 | Addink | |
| 2003/0120393 A1* | 6/2003 | Bailey | A01G 25/16 700/284 |
| 2003/0201675 A1 | 10/2003 | Alexanian | |
| 2004/0026529 A1 | 2/2004 | Float | |
| 2004/0089346 A1 | 5/2004 | Sutardja | |
| 2004/0090345 A1 | 5/2004 | Hitt | |
| 2004/0100151 A1 | 5/2004 | Smyth | |
| 2004/0100394 A1 | 5/2004 | Hitt | |
| 2004/0140907 A1* | 7/2004 | Morin, II | G08C 17/02 340/12.23 |
| 2004/0194833 A1* | 10/2004 | Townsend | A01G 25/16 137/624.11 |
| 2004/0206395 A1* | 10/2004 | Addink | A01G 25/16 137/80 |
| 2004/0206405 A1 | 10/2004 | Smith | |
| 2004/0217189 A1* | 11/2004 | Regli | A01G 25/167 239/69 |
| 2004/0225412 A1 | 11/2004 | Alexanian | |
| 2005/0060065 A1 | 3/2005 | King-Yuan | |
| 2005/0098649 A1 | 5/2005 | Thornton | |
| 2005/0107924 A1 | 5/2005 | Bailey | |
| 2005/0137752 A1 | 6/2005 | Alvarez | |
| 2005/0156068 A1* | 7/2005 | Ivans | A01G 25/16 239/723 |
| 2005/0167625 A1 | 8/2005 | Deen | |
| 2005/0192710 A1* | 9/2005 | Thornton | A01G 25/16 700/284 |
| 2005/0203669 A1 | 9/2005 | Curren | |
| 2005/0267641 A1* | 12/2005 | Nickerson | A01G 25/16 700/284 |
| 2005/0273205 A1 | 12/2005 | Nickerson | |
| 2006/0025875 A1 | 2/2006 | Smith | |
| 2006/0027676 A1* | 2/2006 | Buck | A01C 23/042 239/63 |
| 2006/0030971 A1 | 2/2006 | Nelson | |
| 2006/0043208 A1 | 3/2006 | Graham | |
| 2006/0174707 A1 | 8/2006 | Zhang | |
| 2006/0202051 A1 | 9/2006 | Parsons | |
| 2006/0290399 A1 | 12/2006 | MacDougall | |
| 2007/0010915 A1 | 1/2007 | Burson | |
| 2007/0016334 A1* | 1/2007 | Smith | A01G 25/16 700/284 |
| 2007/0106426 A1 | 5/2007 | Ensworth | |
| 2007/0179674 A1 | 8/2007 | Ensworth | |
| 2007/0191991 A1 | 8/2007 | Addink | |
| 2007/0208462 A1 | 9/2007 | Kah | |
| 2007/0251112 A1 | 11/2007 | San Jose | |
| 2008/0039978 A1 | 2/2008 | Graham | |
| 2008/0058964 A1 | 3/2008 | Nickerson | |
| 2008/0058995 A1 | 3/2008 | Holindrake | |
| 2008/0071426 A1 | 3/2008 | Perez | |
| 2008/0136630 A1 | 6/2008 | Leggett | |
| 2008/0249664 A1 | 10/2008 | Runge | |
| 2008/0251602 A1 | 10/2008 | Leggett | |
| 2008/0275595 A1 | 11/2008 | Bailey | |
| 2008/0319585 A1 | 12/2008 | Nickerson | |
| 2009/0076659 A1 | 3/2009 | Ensworth | |
| 2009/0076660 A1 | 3/2009 | Goldberg | |
| 2009/0099701 A1 | 4/2009 | Li | |
| 2009/0126801 A1 | 5/2009 | Grill | |
| 2009/0150001 A1 | 6/2009 | Fekete | |
| 2009/0150002 A1 | 6/2009 | Fekete | |
| 2009/0204265 A1 | 8/2009 | Hackett | |
| 2009/0216345 A1 | 8/2009 | Christfort | |
| 2009/0222141 A1 | 9/2009 | Ensworth | |
| 2009/0281672 A1 | 11/2009 | Pourzia | |
| 2010/0036536 A1 | 2/2010 | Nelson | |
| 2010/0100247 A1 | 4/2010 | Nickerson | |
| 2010/0106337 A1 | 4/2010 | Sacks | |
| 2010/0145531 A1 | 6/2010 | Nickerson | |
| 2010/0179701 A1 | 7/2010 | Gilbert | |
| 2010/0222932 A1 | 9/2010 | O'Connor | |
| 2010/0241279 A1 | 9/2010 | Samon i Castella | |
| 2010/0268390 A1 | 10/2010 | Anderson | |
| 2010/0286833 A1 | 11/2010 | Kaprielian | |
| 2010/0305764 A1 | 12/2010 | Carr | |
| 2010/0305765 A1 | 12/2010 | Sutardja | |
| 2010/0324744 A1 | 12/2010 | Cox | |
| 2011/0015800 A1 | 1/2011 | Crist | |
| 2011/0040416 A1 | 2/2011 | Nickerson | |
| 2011/0093123 A1 | 4/2011 | Alexanian | |
| 2011/0111700 A1 | 5/2011 | Hackett | |
| 2011/0137472 A1 | 6/2011 | Hitt | |
| 2011/0190947 A1 | 8/2011 | Savelle | |
| 2011/0190948 A1 | 8/2011 | Fekete | |
| 2011/0224836 A1 | 9/2011 | Hern | |
| 2011/0231025 A1 | 9/2011 | Sacks | |
| 2011/0238227 A1 | 9/2011 | Hern | |
| 2011/0288690 A1 | 11/2011 | Ensworth | |
| 2012/0232708 A1 | 9/2012 | Ensworth | |
| 2016/0113219 A1 | 4/2016 | Tennyson | |

FOREIGN PATENT DOCUMENTS

| | | |
|---|---|---|
| EM | 0006591640002 | 1/2007 |
| EM | 0006591640003 | 1/2007 |
| EP | 1324166 A2 | 7/2003 |
| WO | 2005002321 A2 | 1/2005 |
| WO | 2007011999 | 1/2007 |

OTHER PUBLICATIONS

Hunter Industries Incorporated; Hunter brochure for ICR Remote Control; 2 Pages; Copyright 2003; Published Feb. 2003.

PCT; App. No. PCT/US06/28012; International Preliminary Report on Patentability dated Mar. 17, 2009.

PCT; App. No. PCT/US06/28012; International Search Report dated Jul. 3, 2008.

PCT; App. No. PCT/US06/28012; Written Opinion dated Jul. 3, 2008.

Rain Bird Corporation, "E-Class Series, Indoor/Outdoor Multiple Station Timer with Programmer Rain Delay," commercially available prior to Dec. 14, 2006, 1 page, http://web.archive.org/web/20061230224254/www.rainbird.com/diy/products/timers/eclass.htm.

Rain Bird Corporation, "Ec Series Irrigation Controllers, Three Program Hybrid Indoor Controller," commercially available prior to Dec. 14, 2006, 2 pages, http://web.archive.org/web/20070428032252/www.rainbird.com/landscape/products/controllers/ec.htm.

Rain Bird Corporation, "ESP-LXi Series, Indoor/Outdoor Extra Simple Programmer with Drip Program," commercially available prior to Dec. 14, 2006, 1 page, http://web.archive.org/web/20061229090326/www.rainbird.com/diy/products/timers/esplxi.htm.

Rain Bird Corporation, "ESP-MC Series, Four Program Hybrid Controllers," commercially available prior to Dec. 14, 2006, 3

(56) References Cited

OTHER PUBLICATIONS pages, http://web.archive.org/web/20060502184113/www.rainbird.com/landscape/products/controllers/espmc.htm.
Rain Bird, "ISA Series, Multiple Station Indoor Timers," commercially available prior to Dec. 14, 2006, 1 page, http://web.archive.org/web/20061229091114/www.rainbird.com/diy.products/isa.htm.
Rain Bird, "ISB-409, 9 Station Dual Program Indoor Timer," commercially available prior to Dec. 14, 2006, 1 page, http://web.archive.org/web/20061229094429/www.rainbird.com/diy/products/timers/isb409.htm.
Rain Bird, "ISM Series, Irrigation System Manager," commercially available prior to Dec. 14, 2006, 2 pages, http://web.archive.org/web/20070224174857/www.rainbird.com/diy/products/timers/ism.htm.
Rain Bird, "Rain Bird ESP-TM Series, Dual Program Hybrid Irrigation Controllers," commercially available prior to Dec. 14, 2006, 2 pages, http://web.archive.org/web/20060221193813/www.rainbird.com/landscape/products/controllers/esptm.htm.
Rain Bird; "Easy Rain, Single-Valve Battery-Operated Controller;" Commercially Available Prior to May 17, 2007; 2 pgs.; http://web.archive.org/web/20070203083417/www.rainbird.com/landscape/products/control . . . ; Rain Bird Corporation, Glendora, CA.
Remconix 'ICI 500 Wireless Irrigation Information p.' http://www.remconix.co.za/Products/Irrigation/ICI500.html both portrait and landscape versions published at least as early as Mar. 22, 2006 4 pages Remconix (Pty.) Ltd. Republic of South Africa.
Remconix, 'ICI 500 Wireless Irrigation System Brochure,' http://www.remconix.co.za/Products/Irrigation/ICI500.pdf, published at least as early as Mar. 22, 2006, 2 pages. Remconix (Pty.) Ltd., Republic of South Africa.
Remconix, 'ICI 500 Wireless Irrigation System PowerPoint Slide Show,' http://www.remconix.co.za/Products/irrigation/ICI500.html, published at least as early as Mar. 22, 2006, 17 pages, Remconix (Pty.) Ltd., Republic of South Africa.
U.S. Appl. No. 13/689,585; Notice of Allowance dated Sep. 14, 2015.
U.S. Appl. No. 14/490,500; Notice of Allowance dated Dec. 21, 2015.
U.S. Appl. No. 14/968,799; Office Action dated Jan. 10, 2018.
U.S. Appl. No. 11/209,590; Notice of Allowance dated Jun. 28, 2007.
U.S. Appl. No. 11/209,590; Office Action dated Feb. 14, 2007.
U.S. Appl. No. 11/458,535; Notice of Allowance dated Jan. 28, 2009.
U.S. Appl. No. 11/458,535; Office Action dated May 22, 2008.
U.S. Appl. No. 11/458,535; Office Action dated Sep. 4, 2008.
U.S. Appl. No. 11/681,153; Office Action dated Mar. 17, 2008.
U.S. Appl. No. 11/681,153; Office Action dated Jul. 13, 2007.
U.S. Appl. No. 11/876,969; Notice of Abandonment dated Feb. 3, 2009.
U.S. Appl. No. 11/876,969; Office Action dated Jun. 27, 2008.
U.S. Appl. No. 12/212,516; Examiner Interview Summary Action dated Feb. 17, 2011.
U.S. Appl. No. 12/212,516; Examiner Interview Summary Action dated May 27, 2010.
U.S. Appl. No. 12/212,516; Notice of Allowance dated Apr. 21, 2011.
U.S. Appl. No. 12/212,516; Office Action dated Feb. 22, 2010.
U.S. Appl. No. 12/212,516; Office Action dated Apr. 15, 2009.
U.S. Appl. No. 12/212,516; Office Action dated Aug. 16, 2010.
U.S. Appl. No. 12/464,818; Examiner-Initiated Interview Summary dated Apr. 4, 2011.
U.S. Appl. No. 12/464,818; Notice of Allowance dated Jan. 24, 2012.
U.S. Appl. No. 12/464,818; Office Action dated Mar. 24, 2011.
U.S. Appl. No. 12/464,818; Office Action dated Jun. 13, 2011.
U.S. Appl. No. 12/464,818; Office Action dated Sep. 16, 2010.
U.S. Appl. No. 13/192,420; Notice of Abandonment dated Aug. 29, 2012; 2 Pages.
U.S. Appl. No. 13/192,420; Office Action dated Feb. 23, 2012.
U.S. Appl. No. 13/475,863; Notice of Allowance dated Apr. 2, 2013.
U.S. Appl. No. 13/475,863; Office Action dated Aug. 30, 2012.
U.S. Appl. No. 13/689,585; Office Action dated Jun. 4, 2015.
U.S. Appl. No. 13/934,161; Notice of Allowance dated Jul. 3, 2014.
U.S. Appl. No. 13/934,161; Office Action dated Jan. 24, 2014; 8 pages.
U.S. Appl. No. 14/490,500; Office Action dated Mar. 11, 2015.
U.S. Appl. No. 14/968,799; Notice of Allowance dated Oct. 1, 2018.
U.S. Appl. No. 15/077,813; Notice of Allowance dated Sep. 24, 2018.
U.S. Appl. No. 15/077,813; Office Action dated May 10, 2018 (pp. 1-7).

* cited by examiner

| Function | | 48 Bit Serial Number | | | | |
|---|---|---|---|---|---|---|
| Sub Function | Preamble | General Wireless Valve | Specific Valve | CMD ID | Data | Station Number | CRC-Error Correction | Totals |
| Number of Bits | | 16 | 32 | 4 | 4 | 8 | 16 | 80 |

Short Range Wireless Valve Message Protocol

WIRELESS IRRIGATION CONTROL

This application is a continuation of application Ser. No. 15/077,813, filed Mar. 22, 2016, entitled WIRELESS IRRIGATION CONTROL, which is a continuation of application Ser. No. 14/490,500, filed Sep. 18, 2014, entitled WIRELESS IRRIGATION CONTROL, now U.S. Pat. No. 9,320,205, which is a continuation of application Ser. No. 13/934,161, filed Jul. 2, 2013, entitled WIRELESS IRRIGATION CONTROL, now U.S. Pat. No. 8,868,246, which is a continuation of application Ser. No. 13/475,863, filed May 18, 2012, entitled WIRELESS EXTENSION TO AN IRRIGATION CONTROL SYSTEM AND RELATED METHODS, now U.S. Pat. No. 8,504,210, which is a continuation of application Ser. No. 12/464,818, filed May 12, 2009, entitled WIRELESS EXTENSION TO AN IRRIGATION CONTROL SYSTEM AND RELATED METHODS, now U.S. Pat. No. 8,185,248, which is a divisional of application Ser. No. 11/458,535, filed Jul. 19, 2006, entitled WIRELESS EXTENSION TO AN IRRIGATION CONTROL SYSTEM AND RELATED METHODS, now U.S. Pat. No. 7,558,650, which claims the benefit of U.S. Provisional Application No. 60/701,436, filed Jul. 19, 2005, entitled IRRIGATION CONTROL SYSTEM WITH WIRELESS VALVE LINK, all of which are incorporated herein by reference in their entirety.

BACKGROUND OF THE INVENTION

1. Field of the Invention

The present invention relates to irrigation systems. More specifically, the present invention relates to a wireless irrigation control system including a wireless valve link.

2. Discussion of the Related Art

Irrigation systems traditionally are used in many different applications, including, for example, commercial applications, residential applications, and on golf courses. Traditionally, when the irrigation system is installed, trenches are dug for the water piping. The same trenches are used for the wiring that connects valves to an irrigation controller. Generally, the wiring is a 24 AC power line that opens a valve coupled to a water pipe when 24 volts is applied to the power line. When there is no voltage applied to the power line, the valve closes, shutting off water flow through the valve. This is a convenient solution when a water system is first being installed because the trenches need to be dug for the water pipes in order to get water to various locations. However, if water pipes have already been installed, or a new zone is being added to the watering system there may not be a need to dig trenches all the way from the controller to the new zone because the water pipes are already installed for much of the distance in between the controller and the new zone. The additional water pipes are simply tapped into the existing water pipes. Therefore, connecting the power line from the valve for the new zone to the controller can be a very burdensome task.

Additionally, a number of other problems are created by installation and use of wires coupling an irrigation controller to remotely located valves. For example, when using traditional valves that are coupled to an irrigation conduit or through wires, there is a need to trench and place conduit or direct burial wire. Additionally, in-ground wiring is subject to induced lightning surges that can damage the irrigation controller or the valve solenoid. Induced lightning surges are prevalent in many areas, such as Florida. Further, wires deteriorate over time and can be exposed to damage during landscaping. Deteriorated or broken wires will cause the irrigation system to fail to properly control the actuation of valves. Still further, adding valves to a new or existing irrigation system requires trenching, designing around existing construction and landscaping or demolishing and replacing existing construction and landscaping. All of these can be very costly and undesirable. Finally, irrigation wires, once buried are difficult to locate. Additions or modifications require the use of special equipment to locate wires and/or wire breaks.

Therefore, it would be advantageous to have irrigation system that did not require power lines from the irrigation controller to the valve.

SUMMARY OF THE INVENTION

Several embodiments provide wireless extensions to an irrigation controller system and related methods of use, as well as other improvements to irrigation control equipment.

In one embodiment, the invention can be characterized as a method for use in controlling irrigation comprising: receiving, at a first controller of a transmitter unit via a connector, an indication that an irrigation controller has activated an irrigation station, the connector coupled to the irrigation controller, the irrigation controller having station actuation output connectors for activating irrigation stations, wherein the transmitter unit has a user interface comprising one or more user inputs, and causing, responsive to the indication, transmission of a wireless activation signal by a signal transmitter coupled to the first controller, the wireless activation signal configured for receipt at a wireless receiver unit located remotely from the transmitter unit and coupled to an actuator and an actuatable device.

In another embodiment, the invention can be characterized a method for use in controlling irrigation comprising: receiving, at a first controller of a transmitter unit, an indication that an irrigation controller has activated an irrigation station, the transmitter unit including the first controller and a user interface comprising one or more user inputs, the transmitter unit having a connector configured to be coupled to the irrigation controller having station actuation output connectors for activating stations, and causing the transmitter unit to transmit a wireless activation signal responsive to the indication, the wireless activation signal being configured to be received by a receiver unit, the receiver unit configured to be coupled to an actuator coupled to an actuatable device, the actuator configured to actuate the actuatable device, the receiver unit configured to cause the actuator to actuate the irrigation valve in response to receiving the wireless activation signal.

BRIEF DESCRIPTION OF THE DRAWINGS

The above and other aspects, features and advantages of the present invention will be more apparent from the following more particular description thereof, presented in conjunction with the following drawings, wherein.

Figure 1:
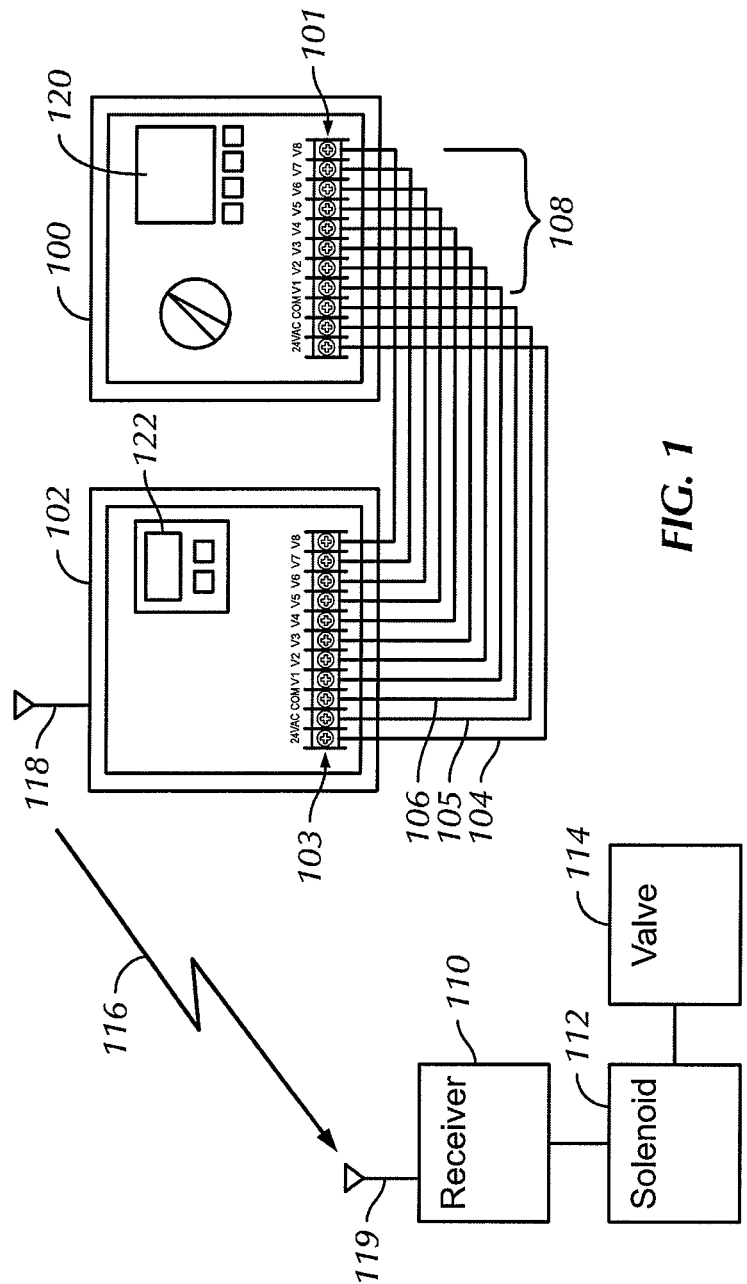
FIG. 1 is a block diagram illustrating a wireless irrigation control system including a wireless link to valves in accordance with one embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions, sizing, and/or relative placement of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is usually accorded to such terms and expressions by those skilled in the corresponding respective areas of inquiry and study except where other specific meanings have otherwise been set forth herein.

DETAILED DESCRIPTION

The following description is not to be taken in a limiting sense, but is made merely for the purpose of describing the general principles of the invention. The scope of the invention should be determined with reference to the claims. The present embodiments address the problems described in the background while also addressing other additional problems as will be seen from the following detailed description.

Referring to FIG. 1, a block diagram is shown illustrating an irrigation system including a wireless valve link in accordance with one embodiment. Shown is an irrigation controller 100 having connectors 101, a transmitter 102 (also referred to as a wireless transmitter or a transmitter unit 102) having connectors 103, a power line 104, a ground line 105, a common line 106, a plurality of actuation lines 108 (also referred to as station actuation lines or station activation lines), a receiver 110 (also referred to as a wireless receiver or a receiver unit 110), a solenoid 112 (generically referred to as an actuator), a valve 114 (generically referred to as an actuatable device) and a wireless link 116 (also referred to as a communication link).

The irrigation controller 100 is electrically coupled to the transmitter 102 via the connectors 101 and 103 through the power line 104, the ground line 105, the common line 106, and the plurality of actuation lines 108. The transmitter 102 sends messages to the receiver 110 through the wireless link 116. The receiver 110 is electrically coupled to the solenoid 112. The solenoid 112 is connected to the valve 114. The transmitter 102 is a wireless transmitter which includes radio frequency (RF) transmitter circuitry (not shown) and an antenna 118. The receiver 110 includes corresponding radio frequency receiver circuitry (not shown) and an antenna 119. It is understand that other types of wireless transmitters and receivers may be implemented within the transmitter 102 and the receiver 110, such as other electromagnetic or optical communication devices. It is noted that generically, the radio frequency (RF) transmitter circuitry and the antenna 118 can be referred to as a wireless signal transmitter. Similarly, the radio frequency receiver circuitry and the antenna 119 can be generically be referred to as a wireless signal receiver. It is understood that in other embodiments, wireless signal transmitters and wireless signal receivers other than those specifically designed for radio frequency signals may be used in other embodiments.

The irrigation controller 100 is powered from, for example, a standard 60 Hz power outlet. In the embodiment shown, the irrigation controller 100 provides power to the transmitter 102 through the power line 104 and the receiver 110 is battery powered, for example, by a D-Cell battery. In an alternative embodiment, the receiver 110 is, for example, solar powered. In this embodiment, the receiver includes or is coupled to, for example, photovoltaic (PV) cells that covert sunlight directly into electricity. These cells may be used to charge one or more capacitors. The electricity is used to power the receiver.

In one embodiment, the irrigation controller 100 (generically referred to as an electronic control device) is for example, a programmable irrigation controller that stores and executes one or more watering programs or schedules. In some embodiments, the irrigation controller executes an irrigation schedule that defines watering days, start times and watering durations for one or more stations. The irrigation controller 100 includes a microcontroller with a processor and memory. The irrigation controller 100 includes a user interface 120 to allow the user to program the controller 100 and for information to be displayed to the user. The irrigation controller 100 controls the operation of one or more watering station or zones. For example, the irrigation controller 100 has station output connectors at connector 101 for controlling eight different stations or zones in one embodiment. In accordance with the one embodiment, each controllable station zone includes an actuator, such as a solenoid 112 (for example, a latching solenoid) and an actuatable device, such as an irrigation valve 114. It should be understood that only one station is shown in the present embodiment for clarification purposes, however, one or more stations or zones can be operated in the manner described herein. The solenoid 112 is electrically coupled to the receiver 110. The receiver 110 activates and deactivates the actuator, which actuates the actuatable device. For example, in several embodiments, the receiver 110 activates and deactivates the solenoid 112 which in turn mechanically opens and closes the valve 114. In a preferred embodiment, the receiver 110 operates one or more latching solenoids. In one embodiment, the receiver 110 is coupled to and controls the activation of four latching solenoids corresponding to four different watering stations or zones. Latching solenoids are preferably used to conserve battery power of the receiver 110.

It is noted that in other embodiments, the irrigation controller 100 is not necessarily a programmable irrigation controller. For example, the irrigation controller 100 has a set program functionality not programmable by a user, or the irrigation controller is under the control of another programmable irrigation controller (such as a central controller or a handheld controller), such that the other irrigation controller is programmable or otherwise executes one or more watering programs and sends instructions to the irrigation controller 100, which acts as a slave to the other controller and simply takes the instructed action. (e.g., turn on or turn off a station). Additionally, it is understood that the irrigation controller 100 may be programmable on many different levels. For example, in some embodiments, the irrigation controller 100 includes a microprocessor, memory and an electronic user interface as described above, and has many programmable features known in today's irrigation controllers. However, in some embodiments, the irrigation controller 100 is mechanically programmable by pushing switches and levers that result in a timer-based schedule of station activation. Regardless of the specific type of irrigation controller, whether it is programmable or not, or the level or complexity of programmability, and in accordance with several embodiments, the irrigation controller 100 should have a plurality of station output connectors (or station output actuation connectors) that allow the coupling of a plurality of actuation lines 108 (station actuation lines). These actuation lines carry station activation signals from the irrigation controller 100 to actuate actuatable devices, which in preferred form, are irrigation valves, but in other forms, may be indoor/outdoor light devices, pumps, gas flow control devices, etc. In preferred form, these activation signals take the form of an AC voltage wave that actuates a non-latching solenoid so long as the AC voltage waveform is applied to the station actuation line by the station output connector. In other embodiments, the station activation signal may be a short pulse signal suitable to actuate a latching solenoid or another electrical signal suitable to actuate an electrical relay or switching device.

As described above in the background, traditionally, the irrigation controller 100 is coupled directly to a solenoid (e.g., a non-latching solenoid) through an actuation line. When it is time to activate a station for a zone to receive water, the irrigation controller provides the solenoid 112 corresponding to the station with a 24 volt AC power signal over the actuation line. The solenoid 112 opens the valve and the sprinkler devices corresponding to the station or zone receive water. When the irrigation controller determines it is time to stop watering in the zone, the irrigation controller stops providing the 24 AC volt power signal to the solenoid which then turns off the valve.

Several embodiments allow for the same irrigation controller 100 to be utilized in an irrigation system that includes the wireless link 116 as a replacement for or in addition to the wireline connections to the solenoid activated valves. That is, traditionally, the actuation line is a wire that is installed underground and runs from the irrigation controller 100 all the way to the solenoid. This can be a fairly long distance which has a number of disadvantages that are described above in the background. In contrast, several embodiments include the transmitter 102 and the receiver 110 that are used to form the wireless link 116 between the irrigation controller 100 and the solenoid 112. The wireless link 116 is, for example, a one way (i.e., from the transmitter 102 to the receiver 110) communication link between the transmitter and the receiver. For example, the wireless link utilizes a 27 MHz frequency band to send signals from the transmitter to the receiver. Other frequency bands are used in alternative embodiments. Alternatively, the wireless link is a two-way communication link between the transmitter and the receiver. In this alternative embodiment, the receiver can transmit data back to the transmitter, for example, to confirm receipt of a command or to send information about the operation of the receiver back to the transmitter.

In accordance with several embodiments, the irrigation controller 100 operates in the same manner as if it were not connected to the transmitter 102. In other words, the operation of the irrigation controller 100 is independent of the operation of the transmitter 102. From the viewpoint of the irrigation controller 100, the actuation lines 108 at its connectors 101 are wireline connections to the solenoids in the field. The irrigation controller 100 is unaware that the wireless link 116 exists. Likewise, the operation of the transmitter 102 is independent of the operation of the irrigation controller 100, other than the fact that the transmitter 102 uses the station outputs of the controller 100 as its inputs. This provides the ability to add a wireless extension or wireless capability to any existing irrigation system designed with station output connectors that operate with wireline actuation lines 108 without any modification to the irrigation controller 100. Advantageously, one would not need to replace the traditional controller 100 with a wireless capable controller. Instead, the wireless transmitter 102 would be coupled to the irrigation controller 100 and the controller 100 does not know the difference. In operation, in one embodiment, the irrigation controller 100 provides a 24 volt activation signal at its connectors 101 which normally go to directly to a solenoid via a wireline connection, but instead go to the transmitter 102 over one of the plurality of actuation lines 108. The transmitter detects or senses that the activation signal has been received at its connectors 103 (i.e., the transmitter receives an indication that the irrigation controller 100 intends to activate the station or zone). It is noted that when the controller 100 activates a station, this may reflect a decision made by the irrigation controller 100 when executing a watering program, or may reflect an action taken by the controller 100 (for example, in embodiments where the controller does not make a decision to activate a station, but simply follows an instruction to activate a station issued by another controller controlling the controller 100, such as a central controller or handheld controller). Thus, generically, the controller 804 receives an indication that the irrigation controller 100 has activated a particular station. Once the transmitter receives this indication, e.g., the transmitter receives the activation signal, then the transmitter 102 sends a wireless activation signal to the receiver 110 over the wireless link 116.

Upon receipt of the wireless activation signal from the transmitter 102, the receiver 110 outputs signaling to an actuator that actuates an actuatable device, e.g., the receiver 110 sends a pulse to the latching solenoid 112 in order to activate the latching solenoid 112. In turn, the latching solenoid 112 opens the valve 114 which allows water to flow therethrough to one or more sprinkler devices downstream. Generally, the solenoid 112, the valve 114 and the sprinkler devices are collectively referred to as a station or zone. In one embodiment, the transmitter 102 repetitively transmits the same wireless activation signal to the receiver 110 in intervals of, for example, three or four seconds, so long as the irrigation controller 100 is still providing the 24 volt power signal over the actuation line. The receiver 112 keeps the valve 114 open so long as it keeps receiving the wireless activation signal from the transmitter 102.

When the irrigation controller 100 intends that the valve 114 should be shut off, the controller 100 stops outputting the 24 volt power signal to the transmitter 102 just as it would normally stop outputting the 24 volt power signal to a solenoid in prior systems. The transmitter 102 senses the termination of the activation signal on the given actuation line 108 and stops transmitting the wireless activation signal. Optionally, the transmitter 104 transmits a stop signal to the receiver 110. After the receiver 110 stops receiving the wireless activation signal for a predetermined period of time (for example, one minute), the receiver 110 signals an actuator to actuate the actuatable device to deactivate the device, e.g., the receiver 110 outputs a second pulse to the latching solenoid 112. Upon receipt of the second pulse, the latching solenoid 112 closes the valve 114. By having the receiver 110 send a pulse to the latching solenoid 112 after a time period of not receiving the wireless activation signal, this prevents a zone from not turning off because the receiver 110 missed, for example, the stop signal from the transmitter 102. This feature provides protection from the latching solenoid keeping the valve open for longer than desired and possibly causing flooding in a watering zone. Details about the transmitter 104, the receiver 110, and the signaling from the transmitter 104 to the receiver 110 are discussed further herein below.

While the receiver 110 is shown functionally separate from the solenoid 112, in one embodiment, the receiver 110 and solenoid 112 are built together as a single combined unit, i.e., contained in a single housing. In this manner, the functionality of the receiver 110 and the solenoid 112 are combined into a single housing. In other embodiments, the receiver 110 and the solenoid 112 are each contained in separate housings. In one form, the receiver 110 and the solenoid 112 are separate housings that are designed such that the receiver housing is easily mounted directly onto the solenoid housing (see FIGS. 33 and 34).

Generally, each station output connector 101 of the irrigation controller provides an activation signal on an actuation line 108 via a station output connector to controls an irrigation station or zone. According to several embodiments, the transmitter 102 provides a wireless connection for the sprinkler devices of the zone. In preferred form, the receiver 110 is battery powered and thus, may be easily located without digging trenches or requiring a nearby power source. Alternatively, the receiver may be solar powered.

Figure 31:
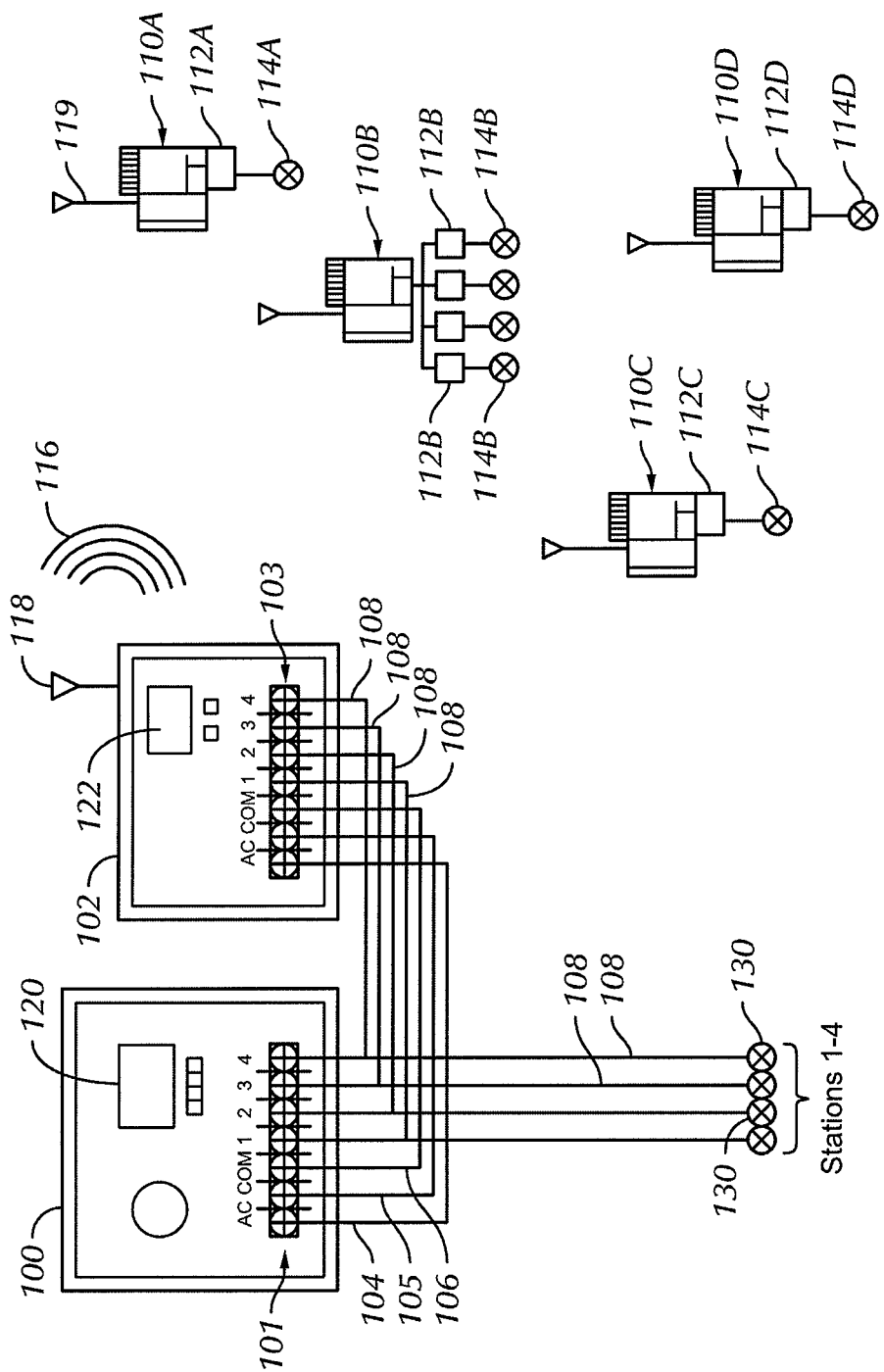
FIG. 31 is a block diagram illustrating a wireless irrigation control system in accordance with a further embodiment.

Although only a single receiver is illustrated in FIG. 1, multiple receivers 110 can be variously located to receive the wireless activation signal from the transmitter 102. FIG. 31 illustrates one embodiment in which four receivers 110A-110D are configured to receive communications from the transmitter 102, e.g., four receivers are paired or matched to the transmitter 102. The receivers 110A-D are paired or matched to the transmitter 102 so that they look for communications only from the transmitter 102. Several pairing techniques are described herein.

In this embodiment, for simplicity, the irrigation controller 100 of FIG. 31 is illustrated as only having four output station connectors at its connector 101, and thus, the transmitter 102 has four station input connectors at its connector 103. It is understood that the number of station outputs or station output connectors of a given irrigation controller can vary, as well as the number of station inputs or station input connectors of the transmitter unit 102. Furthermore, the number of station inputs at the connector 103 does not need to match the number of station outputs of the connector 101.

It is noted that FIG. 31 illustrates that the wireless extension of the irrigation controller 102 operates in addition to the regular wireline control of the irrigation controller 100, as opposed to the embodiment of FIG. 1, which illustrates the replacement of the traditional wireline connections to the irrigation stations. That is, in FIG. 31, actuation lines 108 extend from the station output connectors of the connector 101 a distance to respective solenoid controlled irrigation valves 130 (generically referred to as actuator controlled devices), such as, non-latching solenoids and irrigation valves). They are not illustrated as doing so in the embodiment of FIG. 1. The controller 100 applies a 24 volt signal (i.e., one form of an activation signal) to a given actuation line 108, which causes a given solenoid controlled irrigation valve 130 to open until the 24 volt signal is removed. On top of this level of control of the traditional irrigation controller, another actuation line 108 is coupled from each station output connector of the connector 101 of the controller 100 to the station input connectors of the connector 103 of the transmitter 102. Although FIG. 31 appears to illustrate that a given actuation line 108 splits, in preferred form, the actuation line coupling the station output connectors of the irrigation controller 100 to the station input connectors of the transmitter 102 is directly coupled between the connectors 101 and 103. The controller applies an activation signal to an appropriate actuation line 108 at the appropriate station output connector. Then, the transmitter senses or detects this activation signal, which provides an indication to the microcontroller of the transmitter 102 that the station is to be activated by the irrigation controller 100, e.g., to begin watering. In response, the transmitter 102 transmits a wireless activation signal to the respective receiver 110 or receivers 110 that correspond to that activated station.

In one embodiment, each of the four illustrated receivers 110A-D is configured or programmed to correspond to one of the irrigation stations of the controller. For example, receiver 110A corresponds to station 1, receiver 110B corresponds to station 2, receiver 110C corresponds to station 3 and receiver 110D corresponds to station 4. Accordingly, when the irrigation controller 100 activates station 1 (e.g., it applies a 24 volt signal to the actuation line 108 coupled to the output station connector corresponding to station 1), the solenoid actuated irrigation valve 130 for station 1 opens and allows watering at any downstream sprinkler devices. In addition, the same activation signal is applied to the actuation line 108 coupled from the station output connector for station 1 of connectors 101 to the station input connector for station 1 of the connectors 103. The transmitter 102 senses the presence of this activation signal, which provides an indication to the microcontroller of the transmitter 102 that station 1 is to be activated by the irrigation controller 100. At this point, the transmitter formats a message and modulates it on a wireless activation signal that is transmitted via the wireless link 116 to any receivers paired to the transmitter 102. All matched receivers 110A-110D listen for communications from the transmitter; however, only those receivers that correspond to station 1 will act on the wireless activation signal. For example, in this embodiment, only receiver 110A extracts the message from the received wireless activation signal. The receiver 110A then outputs the appropriate signaling to cause an actuator (e.g., a latching solenoid 112A) to actuate an actuatable device (e.g., the irrigation valve 114A). This allows pressurized water to flow through valve 114A to any downstream sprinkler devices. This allows for more sprinkler devices to be effectively controlled by the controller 100, i.e., more sprinkler devices are included within station or zone 1. This could expand or extend the geographic reach of the station or be used to fill in spots that are not adequately irrigated by the existing sprinklers of the station.

Alternatively, more than one of the receivers corresponds to each station. For example, receivers 110A and 11C are both configured to correspond to station 1. Thus, both of receivers 110A and 110C respond to the wireless activation signal broadcast via the wireless link 116. Thus, as described above, both receivers 110A and 110C output signaling to cause the respective actuators (e.g., latching solenoids 112A and 112C) to actuate irrigation valves 114A and 114C. This allows pressurized water to flow through valves 114A and 114C to any downstream sprinkler devices. By allowing multiple receivers 110 to receive communications from the transmitter 102, additional sprinkler devices can be added to the zone or station controlled by the irrigation controller 100, all controlled by the single activation signal at a single station output connector placed on the single actuation line 108. Not withstanding water pressure restrictions, the number of receivers 110 that can be added to the station is unlimited. For example, with the addition of several receivers 110 within range of the transmitter 102, tens or hundreds of additional sprinkler devices may be controlled by the one station/zone of the irrigation controller 100. These receivers 110A-110D are remotely located from one another and do not need to be positioned near a constant power source or have wiring trenched to them.

It is further noted that receivers 110A, 110C and 110D have a single valve output, whereas receiver 110B has multiple (e.g., four) valve outputs. Thus, receiver 110B may be referred to as a four zone receiver or as four station receiver. The four valve outputs of the receiver 110B each couple to a respective actuator (e.g., a latching solenoid 112B) that actuates its irrigation valve 114B. Each valve output of the receiver 110B can be assigned to a different station of the controller 100. In this case, the receiver 110B is paired to the transmitter 102 and listens for communications from the transmitter 102. The receiver 110B processes any received message that corresponds to one of the stations it is configured to activate. In one embodiment, the four valve receiver 110B corresponds to four actuation lines 108 coupled to the transmitter, and each of the four solenoids 112B corresponds to one of the four stations.

Figure 32:
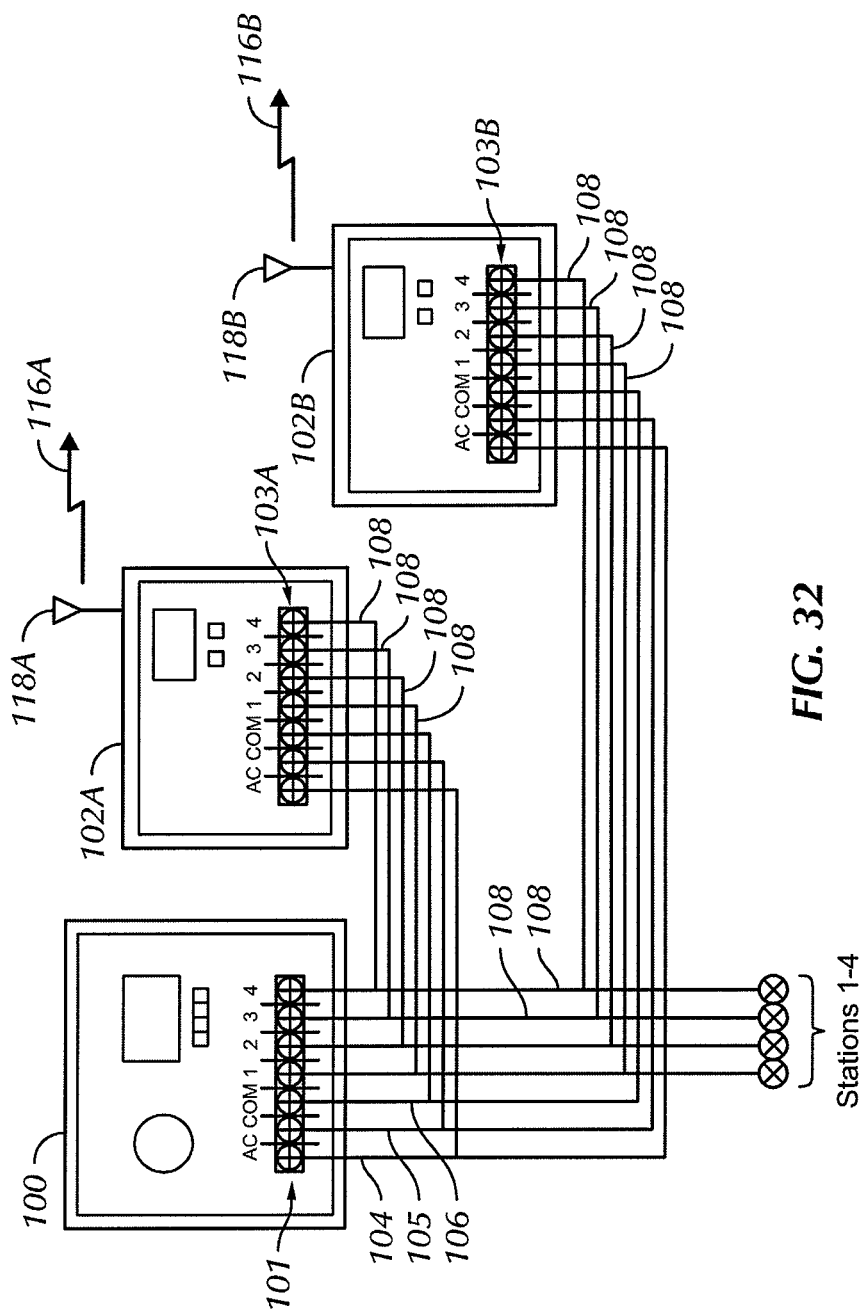
FIG. 32 is a block diagram illustrating a wireless irrigation control system in accordance with yet another embodiment.

Referring next to FIG. 32, it is seen that multiple transmitters 102A and 102B may be coupled to the same irrigation controller 100 in accordance with several embodiments. Advantageously, additional wireless transmitters 102 provide additional actuatable devices (such as valves) for each station controlled by the controller 100. In one embodiment, the transmitters 102A and 102B each transmit to different receivers 110 (not shown) that correspond to one or more stations. In another embodiment, the transmitters 102A and 102B communicate to the same receivers for redundancy. In a further embodiment, each transmitter is connected to and corresponds to a different set of the station output connectors of the connector 1010. For example, in one embodiment, the controller 100 is an eight station controller (even though only four stations are illustrated). Transmitter 102A is coupled to and corresponds to stations 1-4 of the controller 100 whereas transmitter 102B is coupled to and corresponds to stations 5-8 of the controller 100. For example, in one embodiment having an irrigation controller having at least eight station outputs, four actuation lines 108 are coupled to transmitter 102A and four separate actuation lines 108 are coupled to transmitter 102B. With multiple transmitters, the use of directional antennas can help extend communication range and minimize interference. For example, antennas 118A and 118B may be directional antennas directionally transmitting in different directions and allows spatial diversity transmission to be used. The operation of each transmitter 102 is similar to that described above.

It is noted that in many of the embodiments, the reach of the irrigation controller 100 is expanded or extended with the use of one or more transmitters 102 and one or more receivers 110, without modification to the irrigation controller 100 or the watering programs stored and executed by the controller 100 or by another controller (such as a central controller or a handheld controller) controlling the controller 100. In several embodiments, the controller 100 is not aware that additional valves are being operated when it applies an activation signal to a given actuation line. Thus, the operation of the controller 100 is independent of the operation of the transmitters and receivers. In preferred form, the transmitters 102 and receivers 110 described herein are accessory add-on devices that enhance the operation of the controller without modifying the controller 100 in any way. For example, the controller 100 is provided with a wireless link to control valves or other actuatable devices that are part of a given station. Additionally, in some embodiments, the number of valves controllable by each station of the controller 100 may be dramatically increased, only limited by water pressure concerns. Furthermore, in some embodiments, the range of valves controlled by the controller 100 is extended depending on the frequency and transmission scheme used by the transmitters 102.

Additionally, while in preferred form, the wireless link 116 is a one-way link from the transmitter 102 to the receivers 110, in other embodiments, the wireless link is a two-way communication link. For example, transmitting and receiving elements are present at both the transmitters and receivers (i.e., they each become transceivers or two-way communication devices).

It is noted that in the embodiments described herein, the latching solenoids coupled to each of the receivers 110 are generally mechanical actuators, and that in other embodiments, other types of actuators, such as other mechanical actuators or electrical actuators, such as electrical relays or switches may be used. Accordingly, the solenoids are generically referred to as actuators. Additionally, the described irrigation stations are generically for the purpose of actuating an irrigation valve, however, in some embodiments, one or more of the stations controlled by the controller 100 (and the transmitter 102/receiver 110) may control any actuatable device. For example, an actuatable device may be any triggerable or switchable device, such as a light switch (e.g., for timer controlled outdoor or indoor lighting), a pump (e.g., a timer controlled master water pump or a pool pump), etc. Additionally, in preferred form, the activation signals take the form of an AC voltage wave that actuates a non-latching solenoid so long as the AC voltage waveform is applied to the station actuation line by the station output connector. In other embodiments, the station activation signal may be a short pulse signal suitable to actuate a latching solenoid or another electrical signal suitable to actuate an electrical relay or switching device.

Figure 2:
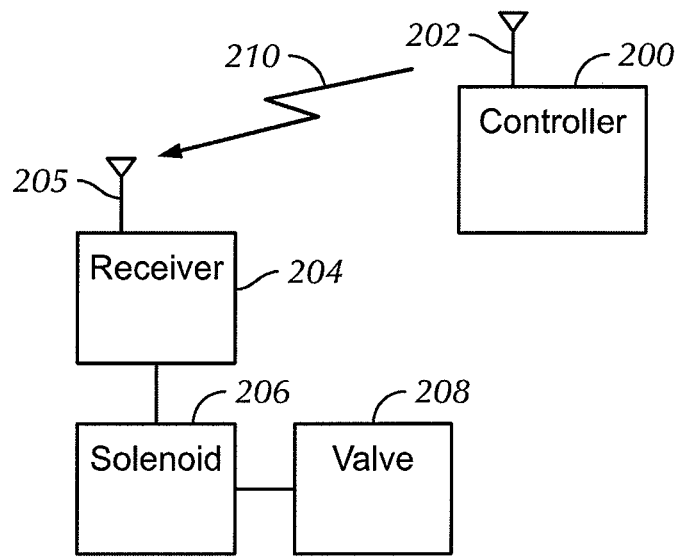
FIG. 2 is a block diagram illustrating a wireless irrigation control system in accordance with another embodiment.

Furthermore, as described above, the irrigation controller may be a programmable irrigation or a non-programmable irrigation controller. The level and type or complexity of programmability (e.g., electrical and/or mechanical programmability) may vary in different embodiments. Regardless of the specific type of irrigation controller, whether it is programmable or not, or the level or complexity of programmability, and in accordance with several embodiments, the irrigation controller 100 has a plurality of station output connectors (or station actuation output connectors) that allow the coupling of a plurality of actuation lines 108 (station actuation lines). The operation of the controller 100 is such that the station output connectors of the controller provide activation signals to actuation lines coupled to actuatable devices, such that the activation signal actuates the actuatable device. According to several embodiments, the transmitter/s 102 and the receiver/s 110 add a wireless extension or wireless capability to any existing irrigation controller designed with such station output connectors without any modification to the irrigation controller 100. In several embodiments, the transmitter receives an indication that the irrigation controller has activated a station and acts accordingly. For example, in preferred form, the transmitter 102 receives the activation signal placed at the station actuation output connector of the controller 100, and in response, causes a wireless activation signal to be transmitted to one or more receivers 110. In response, each receiver outputs signaling to actuate an actuatable device (e.g., an irrigation valve) corresponding to the station. Advantageously, one would not need to replace the traditional controller 100 with a wireless capable controller. In accordance with several embodiments, the irrigation controller 100 operates in the same manner as if it were not connected to the transmitter 102. In other words, the operation of the irrigation controller 100 is independent of the operation of the transmitter 102. From the viewpoint of the irrigation controller 100, the actuation lines 108 at its connectors 101 are wireline connections to the solenoids in the field. The irrigation controller 100 is unaware that the wireless link 116 exists. Likewise, the operation of the transmitter 102 is independent of the operation of the irrigation controller 100, other than the fact that the transmitter 102 uses the station outputs of the controller 100 as its inputs. Referring to FIG. 2, a block diagram is shown illustrating an irrigation system in accordance with another embodiment. Shown is an irrigation controller 200, an antenna 202, a receiver 204 (also referred to as a wireless receiver or a receiver unit 110), a latching solenoid 206 (generically referred to as an actuator), a valve 208, and a wireless link 210 (also referred to as a communication link).

In this embodiment, the irrigation controller 200 includes the antenna 202 and appropriate transmitter circuitry (e.g., signal transmitter) in order to transmit signals to the receiver 204. The receiver 204 is electrically coupled to the latching solenoid 206. The latching solenoid 206 is coupled to the valve 208.

In operation, the irrigation controller 200 sends a wireless activation signal to the receiver 204, received at the antenna 205. Upon receipt of the wireless activation signal, the receiver 204 sends a pulse to the latching solenoid 206 which in turn opens the valve 208. In a preferred embodiment, the irrigation controller 200 repetitively sends the wireless activation signal to the receiver 204, for example, approximately every three or four seconds to avoid interference and account for any sleep/awake periods of the receiver 204. The receiver 204 and latching solenoid 206 will keep the valve open so long as the receiver 204 keeps receiving the wireless activation signal. If the receiver 204 does not receive the wireless activation signal after a predetermined period of time, the receiver 204 sends a pulse to the latching solenoid 206 which causes the valve 208 to close. As described above, this can prevent the valve 208 from remaining open unintentionally for a long period of time due to the receiver missing a stop signal.

In one embodiment, the irrigation controller 200 also sends a wireless deactivation signal to the receiver 204. Upon receipt of the wireless deactivation signal the receiver 204 sends a pulse to the latching solenoid 206 which in turn causes the valve 208 to close. The operation of the receiver 204 is similar to the operation of the receivers described above.

Figure 3:
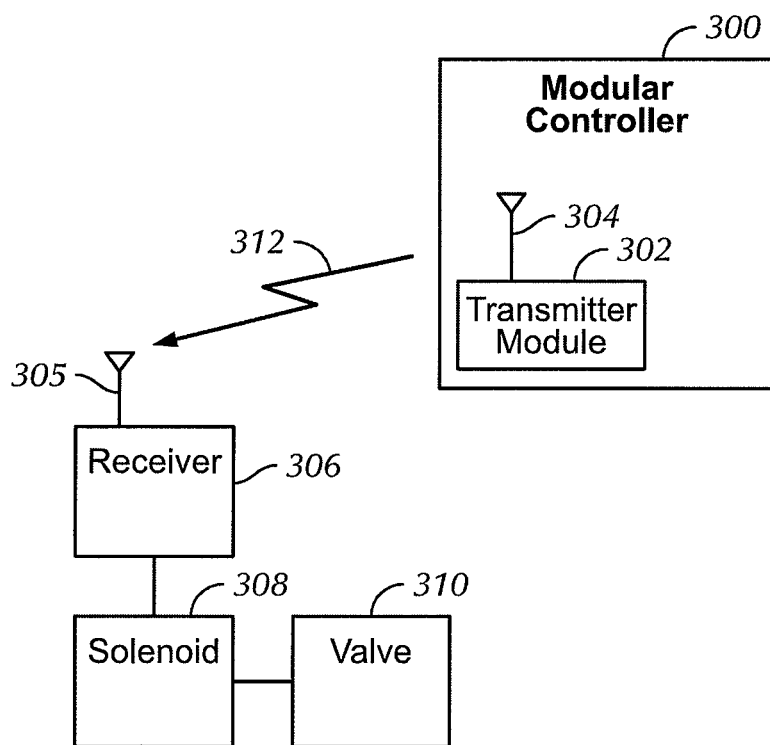
FIG. 3 is a block diagram illustrating a wireless irrigation control system in accordance with yet another embodiment.

Referring to FIG. 3, a block diagram is shown illustrating an irrigation system in accordance with another embodiment. Shown is a modular irrigation controller 300, a transmitter module 302 having an antenna 304, a receiver 306 having an antenna 305, a latching solenoid 308 (generically referred to as an actuator), a valve 310, and a wireless link 312 (also referred to as a communication link).

The modular irrigation controller 300 is detachably coupled to the transmitter module 302. The transmitter module 302 includes the antenna 304 and transmitter circuitry. The receiver 306 is electrically coupled to the latching solenoid 308 which is attached to the valve 310.

The modular irrigation controller 300 is, for example, an irrigation controller such as is described in U.S. patent application Ser. No. 10/687,352, entitled OPEN ARCHITECTURE MODULARITY FOR IRRIGATION CONTROLLERS, filed Oct. 15, 2003 and U.S. patent application Ser. No. 11/022,329, entitled MODULAR AND EXPANDABLE IRRIGATION CONTROLLER, filed Dec. 23, 2004 both of which applications are incorporated herein by reference in their entirety. The modular irrigation controller 300 includes one or more wireless transmitter modules 302 in addition to or in replacement of one or more expansion station modules. Similarly to the irrigation systems described above with reference to FIGS. 1, 2, 31 and 32, the modular irrigation controller 300 and the transmitter module 302 send wireless activation signals to the receiver 306. The receiver in turn activates the latching solenoid 306 which opens the valve 310.

The embodiments described above with reference to FIGS. 1-3 and 31-32 replace the need for wiring connections between the irrigation controller and valves. The trenching costs to run control lines from the irrigation controller to each watering zone is eliminated and in addition potential landscape areas (with access to water) that are not trench accessible can be made viable landscape areas by utilizing the wireless transmitters and the wireless receivers to form the wireless links described herein. The wireless link, in one embodiment, utilizes the unlicensed 27 MHz frequency spectrum to create the wireless link between any irrigation controller and the valves. In one embodiment, the wireless link has an operating range of up to 1000 feet line of sight, thus making it able to satisfy most residential and commercial application needs.

Figure 4:
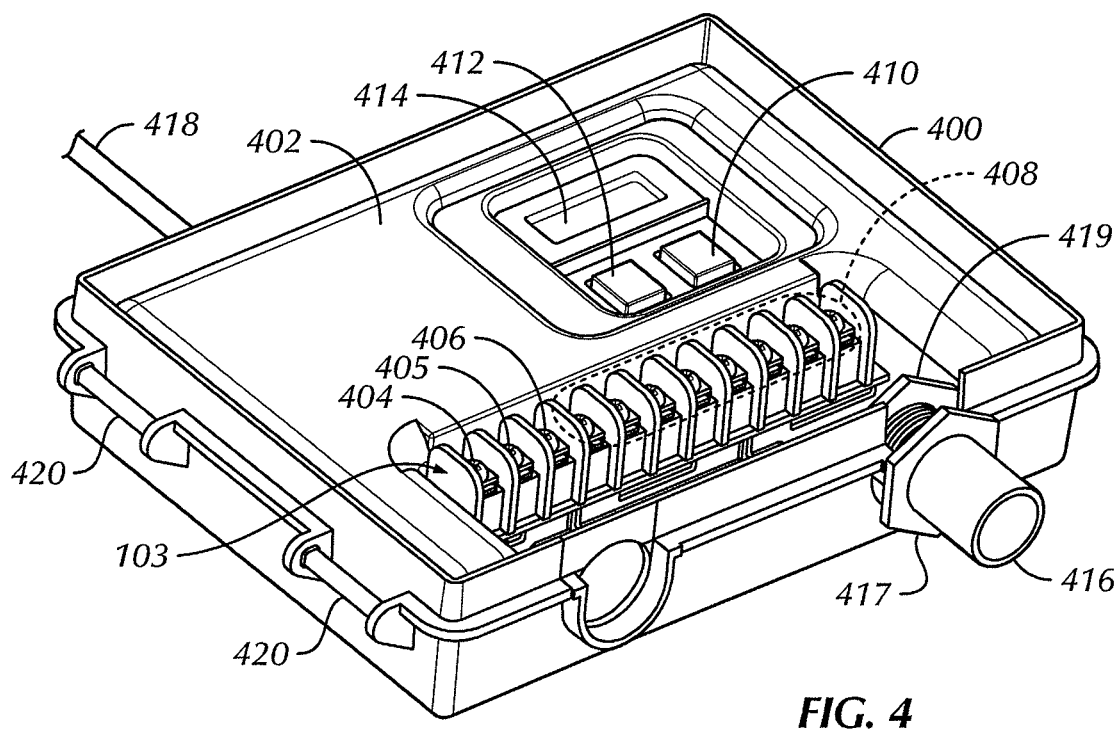
FIG. 4 is a perspective diagram illustrating the transmitter shown in FIG. 1 in accordance with one embodiment.

Referring to FIG. 4, a perspective diagram is shown illustrating the transmitter shown in FIG. 1 in accordance with one embodiment. Shown is a main housing 400 or enclosure, a transmitter housing 402, the connectors 103 including a power line connector 404, a ground connector 405, a common line connector 406, and a plurality of actuation line connectors 408 (also referred to as actuation input connectors or station input connectors). Also shown is a scroll button 410, an enter button 412, a display screen 414, a terminal adapter 416 having a flange 417, a locking nut 419, an antenna 418, and hinges 420.

The main housing 400 (shown without a front cover) encloses the transmitter housing 402. The transmitter housing 402 encloses the electronics of the transmitter, such as the microcontroller, display drivers, radio frequency circuitry, etc. The scroll button 410, the enter button 412 and the display screen 414 are visible on a front surface of the transmitter housing 402 and provide a user interface for the transmitter. The power line connector 404, the ground connector 405, the common line connector 406, and the plurality of actuation line connectors 408 provide electrical contact points for coupling the irrigation controller 100 (shown in FIG. 1) to the electronics of the transmitter. These electrical contact points are also referred to as the input connector of the transmitter (e.g., see connector 103 and connector 810 of FIG. 8).

The display screen 414, the scroll button 410 and the enter button 412 provide a user interface for a user in order to configure the wireless link between the transmitter and the receiver and also to providing information to a user. The information available and the configuration procedure will be described below in detail with reference to FIG. 11.

While not shown, the main housing 400 is adapted to receive a lid that opens and closes and is attached to the housing 400 through the hinges 420. The lid includes a lock in one embodiment in order to prevent unauthorized access to the transmitter. The lid is shown below with reference to FIG. 7. Additionally, a terminal cover (not shown) is provided that either snaps or screws over the connectors 103 to protect the electrical connectors from tampering. An extended knockout feature is illustrated in FIG. 4 and is described further below.

Figure 5:
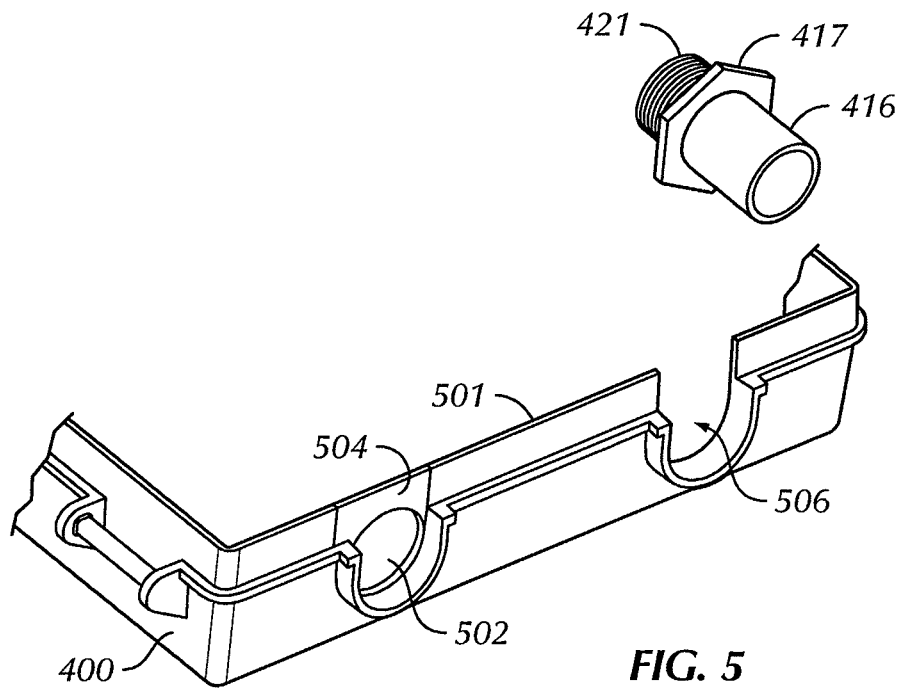
FIG. 5 is a perspective diagram of the transmitter housing with an extended knock-out adapter in accordance with one embodiment.

Referring to FIG. 5, a perspective diagram of the main housing 400 with the extended knock-out adapter is shown in accordance with one embodiment. Shown is the transmitter box or housing 400 having a wall 501, a circular knock-out 502, an additional knock-out portion 504, and the terminal adaptor 416 with the flange 417 and a threaded portion 421.

The circular knock-out 502 is standard for many different devices in the irrigation controller industry. That is, the knockout 502 is formed in a side wall 501 of the housing 400 adjacent the electrical connectors. A knockout is formed by forming a groove or other area of decreased wall thickness about a portion of the wall. The portion of the wall within the boundary of the groove is referred to the knockout. The knockout 502 is removed through the application of a transverse force to the knockout, leaving an opening defined by the groove.

Figure 35:
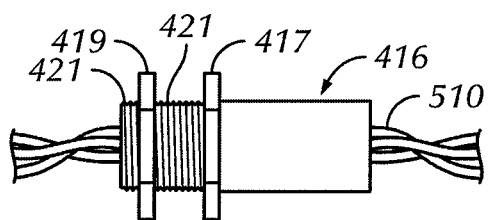
FIG. 35 is a terminal adapter for guiding electrical wiring through an opening formed by a knockout in a housing wall as described in FIGS. 4-6 and including a locking nut in accordance with one embodiment.
Figure 36:
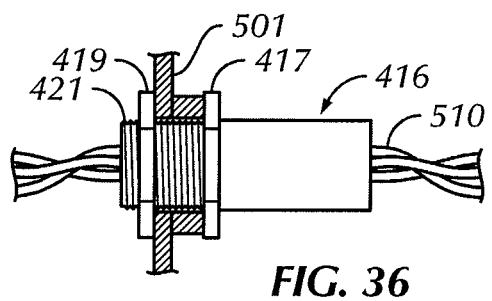
FIG. 36 is a top down view of the terminal adapter and locking nut of FIG. 35 as inserted into the opening formed by the knockouts of FIGS. 4-6 in accordance with one embodiment.
Figure 37:
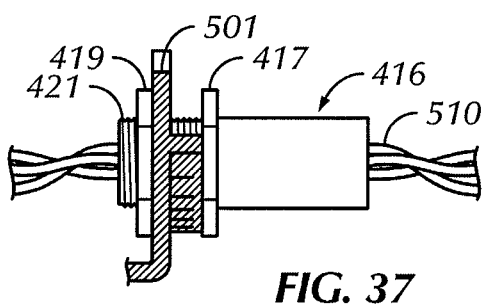
FIG. 37 is a side view of the terminal adapter and locking nut of FIG. 36 as inserted into the opening formed by the knockouts of FIGS. 4-6 in accordance with one embodiment.

In accordance with one embodiment, the additional knock-out portion 504 is provided in combination with the circular knockout 502 in order to provide easy installation of wires from the irrigation controller, particularly when used with the terminal adapter 416. The additional knock out portion 504 extends from a portion of the knockout 502 to an edge of the side wall 501 of the housing 400. The additional knockout portion 504 is formed by grooves formed in the side wall (or other way to decrease the wall thickness) extending from the groove defining the circular knockout 502 to the edge of the wall. When the knockout 504 is removed, it leaves an opening extending from the edge of the wall to the opening formed by the removal of the circular knockout 502, such that the two openings are contiguous. This contiguous opening is shown as opening 506, whereas the left side of FIG. 5 illustrates the knockouts 502 and 504 not having been removed. In one embodiment, the user first removes the circular knockout 502, then removes the additional knockout portion 504. The resulting opening 506 allows the terminal adapter 416 with a locking nut 419 (not shown in FIG. 5, but visible in FIGS. 4, 35, 36 and 37) to easily move into or out of the opening where the circular knock out 502, and the extended knock-out portion 504 were removed from. Due to the limited amount of space in the main housing 400 for electrical connections, the installation of wires can be difficult. This embodiment allows a user to remove both the circular knock-out 502 and the additional knock-out portion 504. During installation, wires 510 (see FIGS. 35-37) from the irrigation controller 100 are connected to the power line connector 404, the ground line 405, the common line connector 406, and the plurality of actuation line connectors 408 (shown in FIG. 4). Either before or after they are connected, the wires are run through the terminal adaptor 416 with the locking nut 419 attached, the terminal adapter 416 being positioned above or adjacent to the housing, i.e., not in the openings formed by the knockouts 502 and 504. A side view of the terminal adapter 416 is illustrated in FIG. 35 with the wires 510 extending therethrough and the locking nut 419 on the threaded portion 421 of the adapter. The terminal adaptor 416 and locking nut 419 are then placed into the space or opening 506 where the circular knock-out 502 and the additional knock-out portion 504 were removed from such that the flange 417 is outside of the housing wall 501 and the locking nut 419 is inside the housing wall 501. In other words, the adapter 416 with the locking nut 419 and the wires 510 are set down into the opening 506 from the edge of the opening. The locking nut 419 is then tightened on the threaded portion 421 of the terminal adaptor 416 that is inside of the irrigation box to ensure that the terminal adaptor 416 remains securely in place. A top down view of the terminal adapter 416 and locking nut 419 as inserted into the opening 501 in relationship to the wall 501 is illustrated in FIG. 36. For clarity, the wall 501 is illustrated with cross hatching. A side view (partial cut away view at a point in the wall 501 adjacent the knockouts) is illustrated in FIG. 37.

As seen in FIG. 4, the additional knockout portion 504 has been removed and the terminal adapter 416 is inserted into position with the flange 417 on the outside of the housing wall and the locking nut 419 on the inside of the housing wall and tightened. The opening from the additional knock-out portion 504 remains (as also seen in the top view of FIG. 36 and the side view of FIG. 37). The terminal adapter 416 is a standard adapter to a PVC tube through which the electrical wiring can run and includes a hexagonal flange. In this embodiment, the locking nut 419 is a hexagonal nut. It is understood that the geometry of these components may vary in different implementations. Advantageously, this system allows for easier installation of the transmitter into an irrigation system. It is noted that a portion of the opening formed by removing the additional knockout portion 504 remains open (see FIGS. 4, 36 and 37), but is covered and resists water entry when the lid (see FIG. 7) is closed over the main housing 400.

Figure 6:
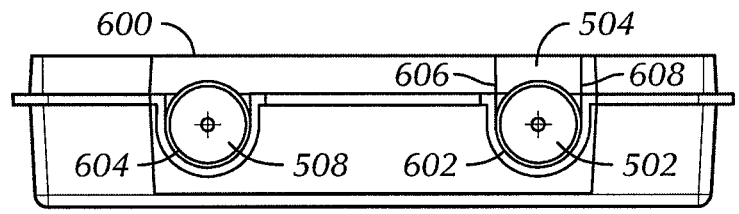
FIG. 6 is a side view of the transmitter box shown in FIG. 5 illustrating an extended knockout in accordance with one embodiment.

Referring to FIG. 6, a side view is shown illustrating one variation of the bottom of the transmitter main housing shown in FIG. 5 in accordance with one embodiment. Shown is the main housing 600, the circular knock-out 502 and the additional knock-out portion 504. Additionally shown is a second circular knock-out 508 without an additional knockout portion 504. Grooves 602 and 604 define knockouts 205 and 508, respectively. Grooves 606 and 608 extend from a portion of the groove 602 to the edge of the wall of housing 400 to form the additional knockout portion 504. This housing 600 is different than the housing of FIGS. 4 and 5 in that there is only one additional knockout portion 504 with the circular knockout 502 on the right side, whereas there are two additional knockout portions 504 (one on the left and one on the right) in FIGS. 4 and 5.

In prior systems, generally only one or more circular knock-outs are included. In accordance with several embodiments, the additional knock-out portion 504 is also included in order to make installation of the wires from the irrigation controller easier. As described above with reference to FIG. 5 and illustrated in FIGS. 4 and 5, when the additional knock-out portion 504 and the circular knock-out portion 502 are removed, the terminal adaptor 416 is placed in the vacant space and an adapter nut 419 is used to hold the terminal adapter 416 in place. It is understood that the second knockout portion 508 could also include an additional knockout portion 504 (like illustrated in FIGS. 4 and 5.

Figure 7:
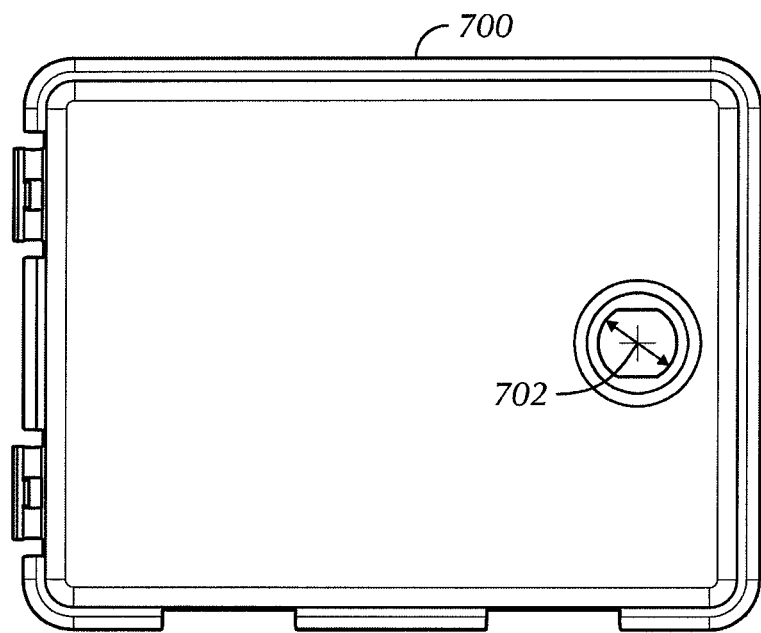
FIG. 7 is a diagram illustrating the lid for the transmitter shown in FIG. 4 in accordance with one embodiment.

Referring to FIG. 7, a diagram is shown illustrating the lid for the transmitter main housing 400 shown in FIG. 4 in accordance with one embodiment. Shown is a hole 702 in the front of the lid 700. A lock that can be opened, for example by a key, is placed through the hole in the front of the lid and is used to close and prevent unauthorized access to the transmitter box.

Figure 8:
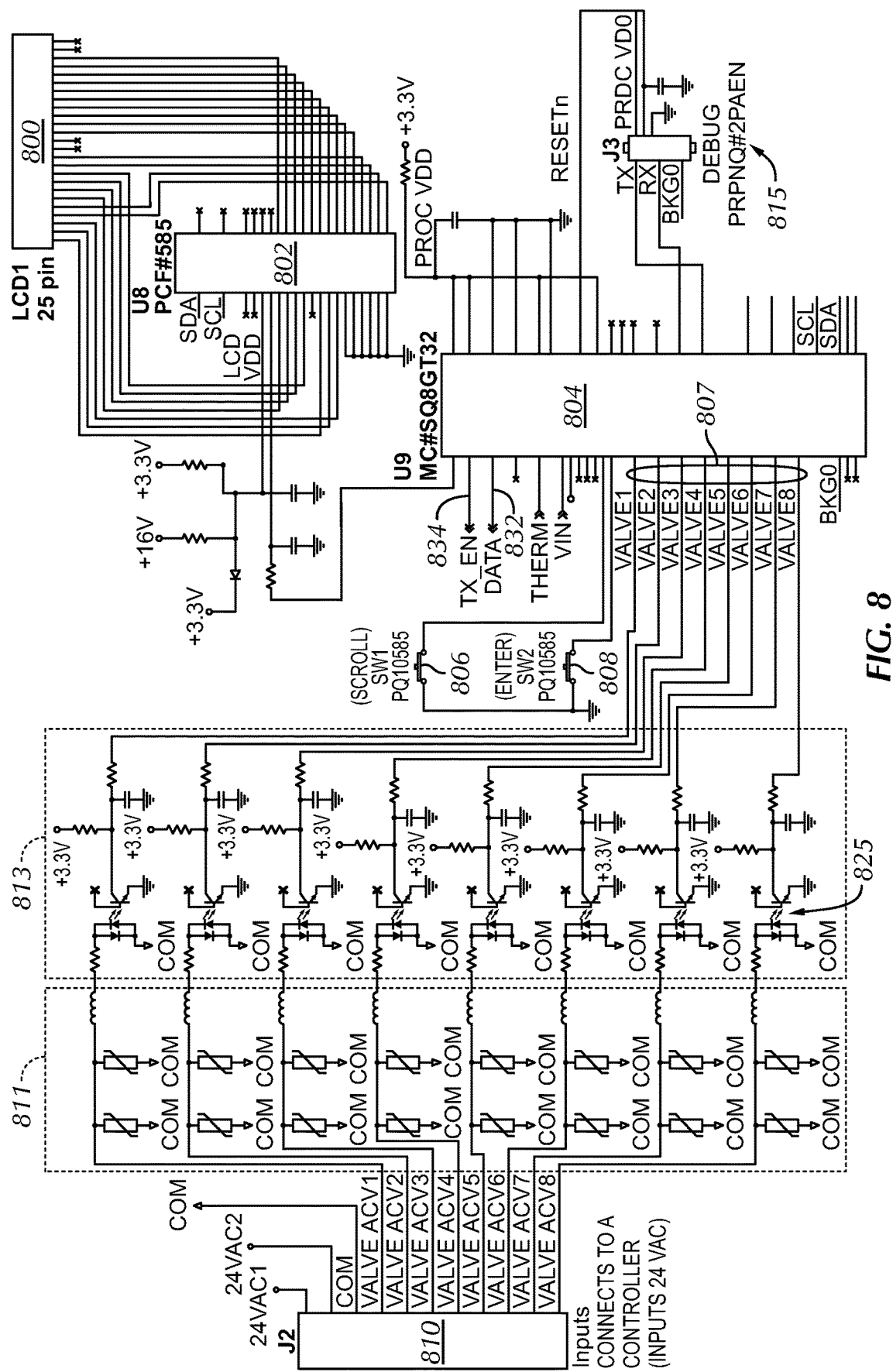
FIGS. 8-10 are collectively a circuit diagram illustrating the transmitter of FIG. 1 in accordance with one embodiment.
Figure 9:
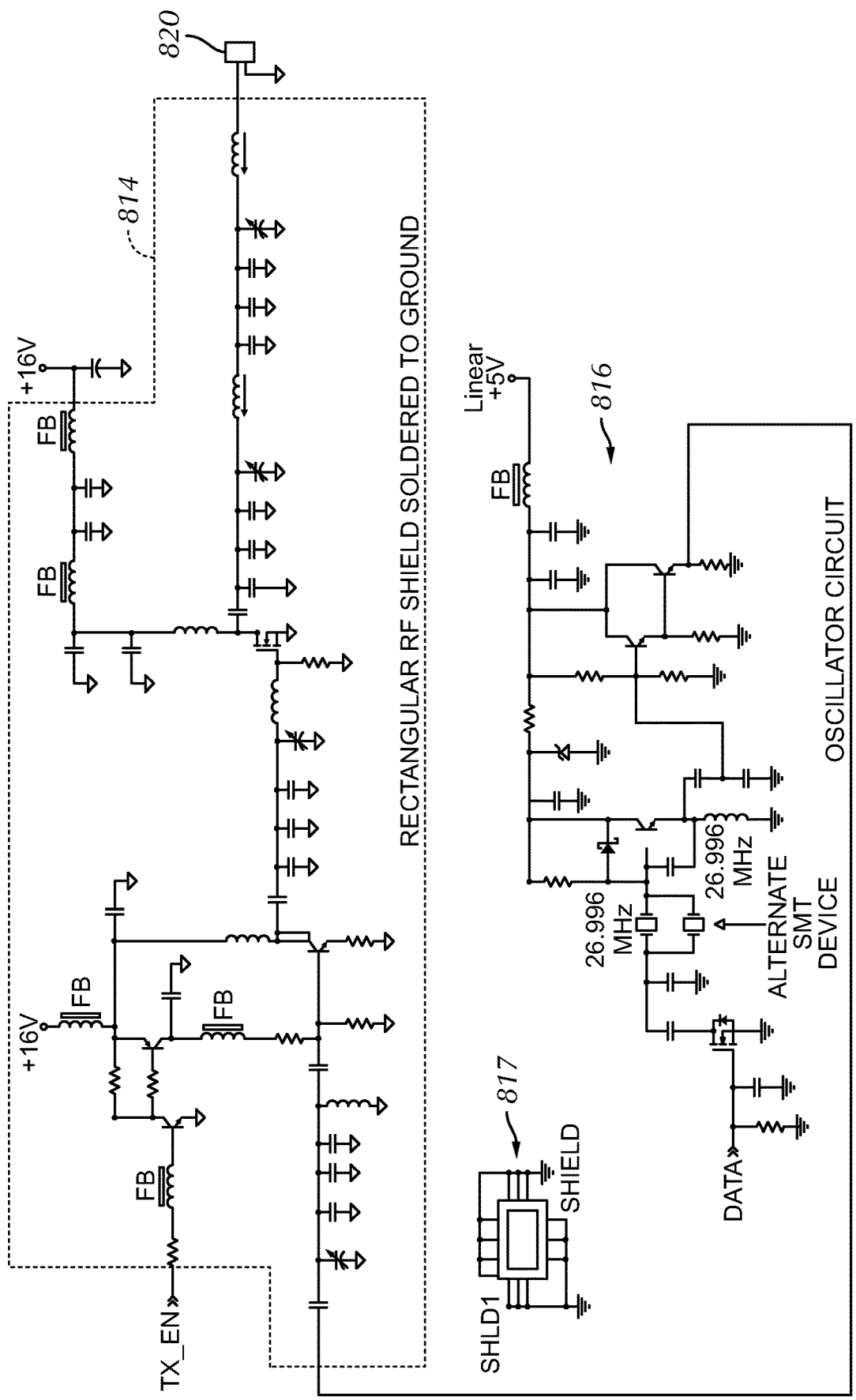
Figure 10:
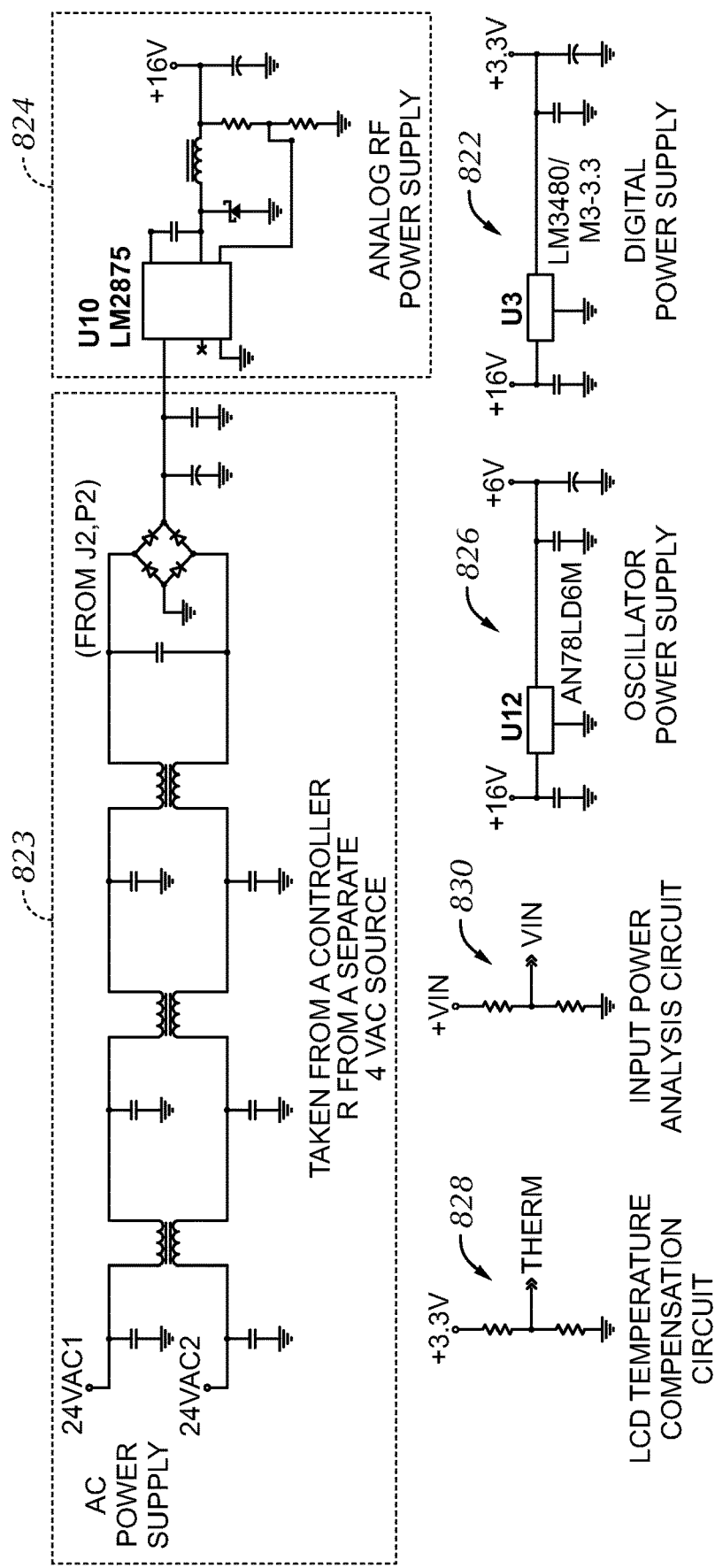

Referring to FIGS. 8-10, a circuit diagram is collectively shown illustrating the wireless transmitter (e.g., the transmitters 102 of FIGS. 1, 31 and 32) in accordance with one embodiment. Shown in FIG. 8 is a liquid crystal display (LCD) 800 (generically referred to as a display screen), a liquid crystal display driver 802 (generically referred to as a display driver), a controller 804 (e.g., a microcontroller including a processor and firmware), a scroll button 806, an enter button 808, a connector 810 (e.g., one embodiment of the connector 103), surge protection circuitry 811, activation sensor circuitry 813, and a test interface 815. Shown in FIG. 9 is an amplifier circuit 814, an oscillator circuit 816, an antenna terminal 820, and an RF shield 817. Shown in FIG. 10 is a logic power supply 822, a main analog power supply 823, an analog RF power supply 824, a digital RF power supply 826, an LCD temperature compensation circuit 828 and an input power analysis circuit 830.

The connector 810 provides electrical contact points for the transmitter 102, for example, including the power line connector 404, the ground connector 405, the common line connector 406 and the plurality of actuation line connectors 408 (station input connectors) described above. For example, the power line 104, the ground line 105, the common line 106 and the actuation lines 108 that couple to the corresponding connection points of the connector 810. The actuation line connectors 408 (e.g., VALVE AC1-VALVE AC8) are electrically coupled to the activation sensor circuitry 813 via the surge protection circuitry 811. The surge protection circuitry 811 can be any known circuitry however, this embodiment incorporates inductors and metal oxide varistors (MOVs). The activation sensor circuitry 813 detects or senses the activation of a station over each of the plurality of actuation lines 108 from the programmable irrigation controller 100. In many embodiments, the controller 100 activates a station (e.g., an irrigation station) by applying a voltage (e.g., an activation signal) to one or more of the actuation lines 108. Since these actuation lines 108 are coupled to the transmitter (e.g., transmitter 102) instead of or in addition to the connection to a given irrigation valve (see FIG. 31), the activation sensor circuitry 813 senses or determines when the controller 100 has activated a station. In one embodiment, the activation sensor circuitry 813 senses when current has been applied to a respective actuation line 108. For example, in the illustrated embodiment, the activation signal applied to a given actuation line 108 by the controller 100 passes through the connector 810 and the surge protection circuitry 811 to a respective opto-isolator 825. The opto-isolator 825 includes a diode that emits light when current passes therethrough. The base of a transistor not physically contacting the diode reacts to the emitted light and turns on the transistor, which sends a signal to the controller 804 at a respective one or more of the input pins 807 of the controller 804. This signal is high or low and indicates to the controller 804 that the irrigation controller 100 has activated a station, e.g., that the controller 100 intends to activate irrigation at the irrigation station corresponding to the particular actuation line 108 in accordance with a stored irrigation schedule. It is noted that when the controller 100 activates a station, this may reflect a decision made by the irrigation controller 100 when executing a watering program, or may reflect an action taken by the controller 100 (for example, in embodiments where the controller does not make a decision to activate a station, but the controller nonetheless activates the station by following an instruction to activate a station issued by another controller controlling the controller 100). Thus, generically, the controller 804 receives an indication that the irrigation controller 100 has activated a particular station. The transmitter 102, thus, senses when the irrigation controller 100 has applied an activation signal (e.g., a 24 volt signal) to a given station output connector 408 over one of the actuation lines 108. Alternatively, the activation sensor circuitry 813 could be configured to sense a voltage change on the actuation lines 108 rather than sense current.

The controller 804 also has inputs from the scroll button 806 and the enter button 808. Additionally, the controller 804 is connected to the LCD driver 802 which controls the LCD display 800. Output from the controller 804 is a data line 832 and a transmit enable line 834. The data line 832 is input into the oscillator circuit 816 (shown in FIG. 9). Additionally, the output from the oscillator circuit 816 is input into the amplifier circuit. The output of the amplifier circuit is output from an antenna coupled to the antenna terminal 820. The RF shield 817 of FIG. 9 encloses the components of the amplifier circuit 814. Test interface 815 is provided to allow an operator to test or configure the controller 804.

In FIG. 10, the main analog power supply 823 is coupled to an input 24 volt AC power from the irrigation controller or an alternate 24 volt AC power source, and provides power to the transmitter 102. For example, the main analog power supply is coupled to the power connectors of the connector 810. Other power supplies for the transmitter derives from the main analog power supply 823 include the analog RF power supply 824, the logic power supply 822 and the digital RF power supply 826.

In operation, when a 24 volt signal is received from an actuation line 108 at the connector 810, as described above, the activation sensor circuitry 813 senses the presence of the activation signal and sends an input signal to the controller 804 that indicates that the irrigation controller 100 intends to activate watering at the particular irrigation station/s. Response to this indication, the controller 804 outputs an output signal at its data line 832 and a transmit signal at its transmit enable line 834, which cause the transmitter 102 to format a message and modulate the message onto a carrier and wirelessly transmit a wireless activation signal via its antenna, this signal indicating that the particular station or zone is to begin watering. Any receiver/s paired to the transmitter and corresponding to that particular station will extract the message from the wireless activation signal and output signaling to actuate an irrigation valve. For example, the receiver/s 110 send a pulsed activation signal to a latching solenoid. The transmitter repetitively re-transmits the wireless activation signal containing the message to the receiver approximately every 3.5 seconds until the 24 volt signal at the connector 810 is no longer present. In preferred form, the controller 804 is configured to randomly vary the transmission interval between repetitive transmissions of the wireless activation signal.

Figure 11:
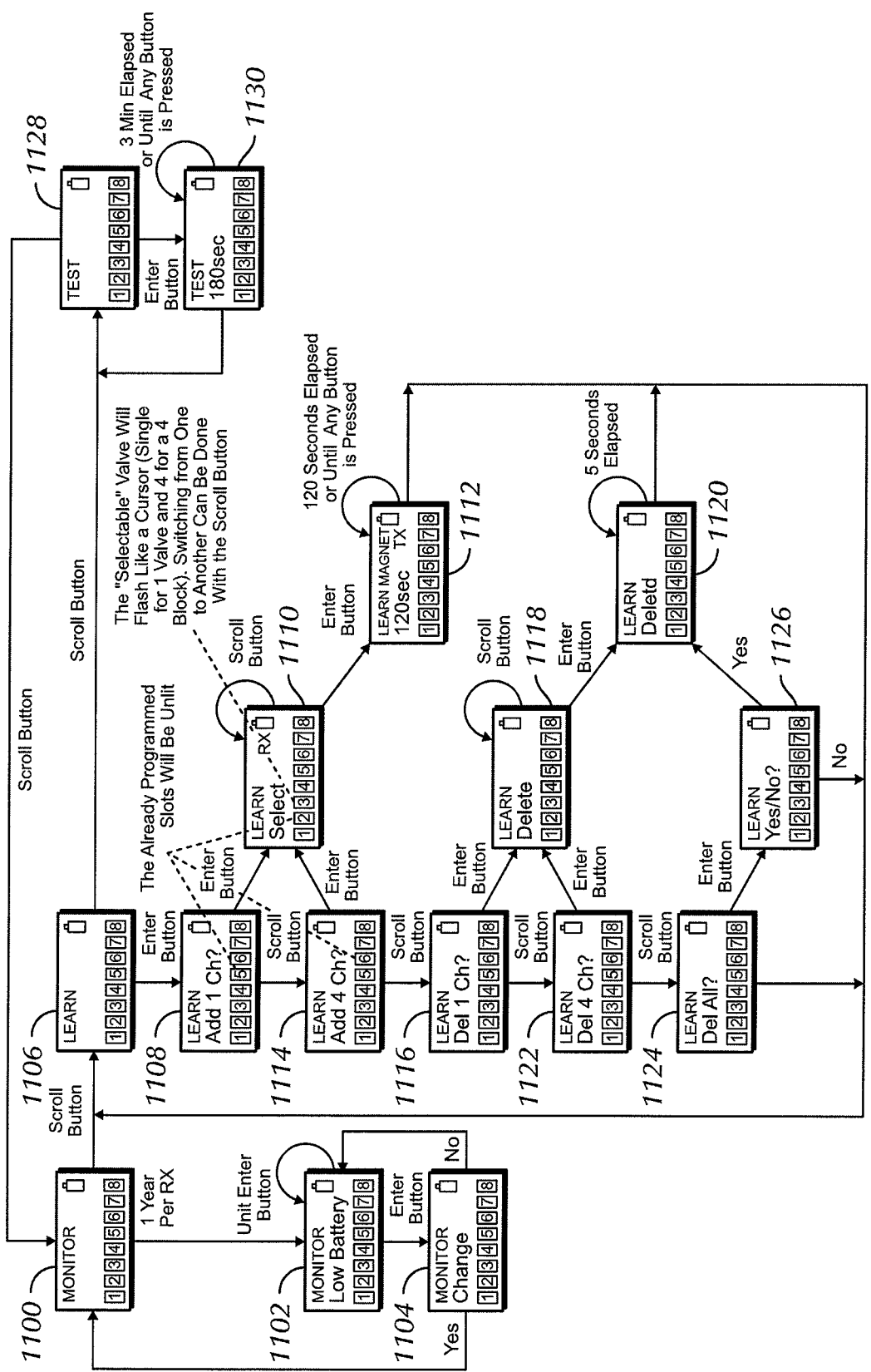
FIG. 11 is a state diagram illustrating operation of the transmitter in accordance with one embodiment.

Referring to FIG. 11, a state diagram is shown illustrating operation of the transmitter in accordance with one embodiment.

In state 1100, the LCD display is in a home state. In state 1102, the LCD displays a low battery warning (e.g., "Lo Bat") once a year. The LCD remains in this state until the enter button (shown in FIG. 4) is selected. The low battery warning indicates to a user that a battery for any receiver in the irrigation system should be changed. This warning is based upon a specific time period (e.g., once a year) and is not a reflection of the actually battery life of any of the receivers. As will be described below, the receiver can indicate to a user an estimation of the battery life remaining by flashing a LED sequence. In state 1104, the LCD monitor displays a prompt (e.g., "change") that asks the user if the batteries in the receivers have been changed. If a user selects the enter button, indicating a "yes" response, the LCD display will return to state 1100. If a user selects the scroll button, indicating a "no" response, the LCD display will return to state 1102.

In state 1100, if a user selects the scroll button, the LCD monitor will go to state 1106. In state 1106, the transmitter is in a learning mode. The learning mode is used to set codes in one or more receivers such that during operation, the code which is unique to one receiver can properly respond to signals from the transmitter. The specific details of the transmitter and receiver signaling is described below with reference to FIGS. 24-28. When in state 1106, if the enter button is selected the LCD monitor changes to state 1108 and displays a prompt (e.g., "Add1c") that asks the user if a single zone receiver (e.g., receiver 110A) is going to be added to the irrigation system. As described above, a receiver can control a single valve or multiple valves (for example, four valves, e.g., receiver 110B). The following description assumes that the valve is either a single zone receiver or a four zone receiver, however, receivers that control a different number of valves can also be utilized in accordance with alternative embodiments. At the bottom of the LCD display there is an indication of the different watering zones in the irrigation system (e.g., zones 1 through 8 in one embodiment). When in state 1108, any zones that are already programmed with either a single zone receiver or a four zone receiver will be lit in order to indicate to the user that a zone is unavailable.

In state 1108, when the enter button is selected by the user the LCD monitor changes to state 1110 and will display a prompt (e.g., "select") that asks a user to select a zone to be programmed. The selected zone will flash indicating which zone will be programmed. When in state 1110 when the scroll button is selected, the selected zone will change, for example, if zone one is flashing and the scroll button is selected, zone two will start to flash. Once a user has the desired zone selected, the user will select the enter button which will cause the display to change to state 1112. When in zone 1112, the transmitter will send out a "learn" signal (described below in more detail with reference to FIG. 28). Any receiver that is in a learning mode (described below with reference to FIG. 29) will learn a code that is unique to the selected zone. The LCD display will stay in state 1112 for a predetermined length of time (e.g., two minutes) while the transmitter continues to transmit the "learn" signal. Any receiver that is in the learning mode and receives the "learn" signal will then be paired to the selected zone of the transmitter. After the predetermined length of time or when either the scroll button or the enter button is pressed, the LCD monitor will return to state 1106.

When in state 1108, if the scroll button is selected, the LCD monitor will change to state 1114 and will display a prompt (e.g., "Add4c") that will ask a user if a four zone receiver is going to be added to the irrigation system. If the enter button is selected, the LCD monitor changes to state 1110. In accordance with one embodiment, a four zone receiver is added to either zones 1-4 or zones 5-8; however, such a receiver may be differently assigned in different embodiments. Therefore, if a single zone receiver has already been added to zone 1, the four zone receiver is added to zone 5-8. In alternative embodiments, the four zone receiver can be added to any four available zones. States 1110 and 1112 then repeat as described above.

When in state 1114, if the scroll button is selected the LCD monitor will change to state 1116 which displays a prompt (e.g., "Del1ch") asking a user if a single zone receiver going to be deleted from the irrigation system. If the scroll button is selected when in state 1118 the LCD monitor will change to state 1122 which displays a prompt (e.g., "Del4ch") asking a user if a four zone receiver going to be deleted from the irrigation system. When in either state 1116 or 1122, if the enter button is selected, the LCD monitor changes to state 1118. When in state 1118, a number of a selected zone or zones to be deleted will flash. For example, if a single zone is going to be deleted zone one will flash. If the scroll button is selected, zone two will start to flash. Once the desired zone is flashing, the enter button is selected which changes the LCD monitor to state 1120. When in state 1120, the LCD will display an indication (e.g., "deletd") that the zone has been deleted from the irrigation system. The LCD monitor will stay in state 1120 for a predetermined amount of time (e.g., 5 seconds) and return to state 1106.

When in state 1122, if the scroll button is selected, the LCD monitor will change to zone 1124 which displays a prompt (e.g., "delAll") asking if all zones are going to be deleted from the irrigation system. If the enter button is selected, the LCD monitor proceeds to state 1126. If the scroll button is selected, the LCD monitor will return to state 1106. When in state 1126, the LCD monitor will prompt the user to confirm they would like to delete all zones in the irrigation system. If the enter button is selected the LCD monitor changes to state 1120 (described above) and if the scroll button is selected the LCD monitor returns to state 1106.

When in state 1106, if the scroll button is selected, the LCD monitor changes to state 1128 which is a test state. If the enter button is selected, the LCD monitor changes to state 1130 and the irrigation system runs sends out a test signal. When a receiver receives a test signal, the receiver will display an information pattern by flashing LEDs that will indicate to a user the received signal strength, battery voltage of the receiver and valve position of the receiver. The operation of the receiver LEDs will be described below with reference to FIG. 12.

Figure 12:
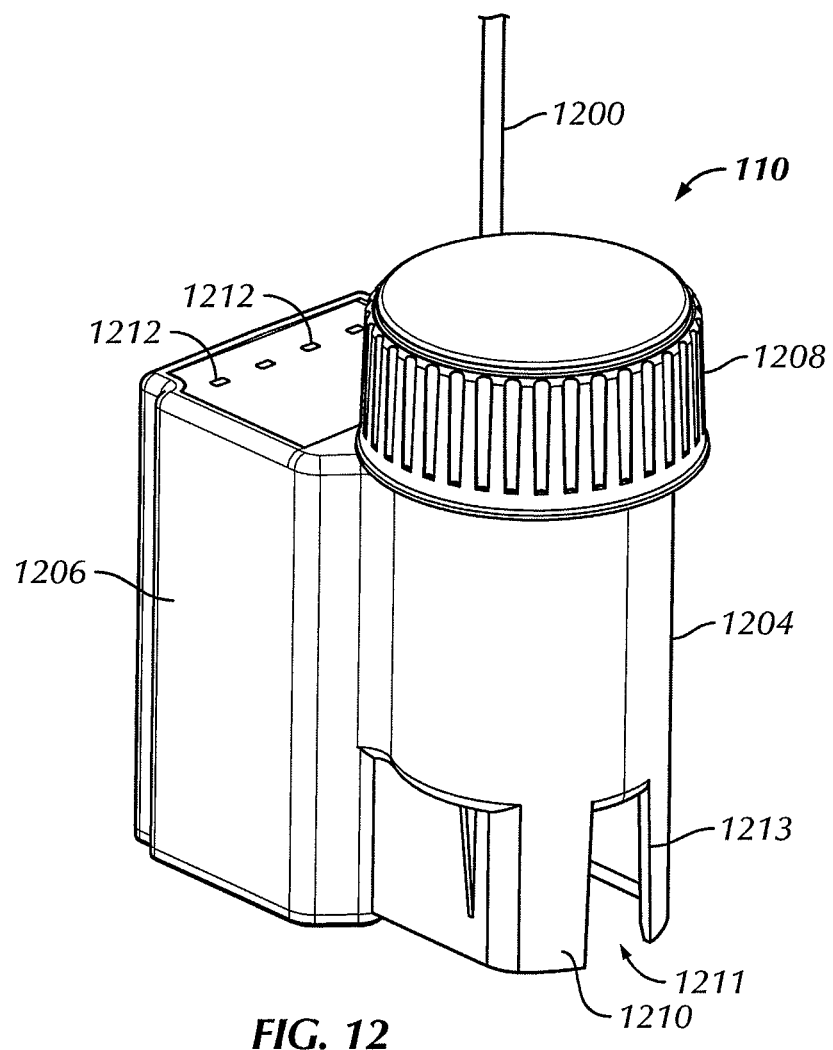
FIG. 12 is a perspective diagram illustrating the receiver shown in FIG. 1 in accordance with one embodiment.

Referring to FIG. 12, a perspective diagram is shown illustrating the receiver shown in FIG. 1 in accordance with one embodiment. Shown is the receiver 110, an antenna 1200, a battery housing portion 1204, a circuitry housing portion 1206, an end cap 1208, a mounting portion 1210 forming a receptor portion 1211, a slot 1213 and four light emitting diodes (LEDs) 1212.

The end cap 1208 is fitted onto the battery housing portion 1204 through matching threading. The battery housing portion 1204, the mounting portion 1210 and the circuitry housing portion 1206 are preferably formed from a single mold. Furthermore, in several embodiments, the entire receiver is watertight. That is, the receiver is formed of a single housing that is sealed watertight. Additionally, the end cap 1208 sealingly engages the battery housing portion 1206. The battery housing portion, as shown is preferably designed for receiving a single D-cell battery that operates at 1.5 volts. The battery (not shown) powers electronics that are enclosed within the circuitry housing portion 1206 and contains a circuit board, controller, radio frequency receiver, etc. Metal contacts (shown and described below with reference to FIGS. 16-19) travel from the terminals of the battery to a circuit board that is within the circuitry housing portion 1206. Preferably, the metal contacts travel through holes in the battery housing portion 1204 that go directly into the circuitry housing portion 1206. The antenna 1200 protrudes from the circuitry housing portion 1206 and is coupled to the electronics that are enclosed therein. The antenna 1200 is preferably flexible such that when the receiver is placed inside of a valve box, the antenna 1200 can bend and easily fit within the valve box. Additionally, the antenna 1200 is fairly long in length, for example, about one foot long. This allows the antenna 1200 to extend to the top of the valve box which is generally above ground or close to the surface of the ground such that the receiver 110 better receives signals from the transmitter 102. The antenna 1200 is shown and described in more detail below with reference to FIGS. 22-23. The circuitry housing portion 1206 is filled with a potting material after the circuit board and electronics are installed to prevent the electronics from being exposed to moisture.

The circuitry housing portion 1208 includes holes covered with a light transmissive material such that the four LEDs 1212 can be seen through the holes when the LEDs 1212 are illuminated. In order to provide information about the operation of the receiver to a user, the LEDs 1212 flash different light sequences to relay specific information. The LEDs 1212 can convey, for example, information about received signal strength, remaining battery strength, and which valve (s) are turned on.

For example, in accordance with one embodiment, in order to indicate to a user the remaining battery strength, the first LED will turn on for ½ of a second. All of the LEDs will then turn off for one second. Following, depending upon the battery strength remaining, one or more of the LEDs will turn on twice in ¼ second intervals. One LED indicates that 20% of the battery power is remaining. Two LEDs flashing indicates that 40% of the battery power is remaining. Three LEDs flashing indicates that 60% of the battery power is remaining. Four LEDs flashing indicates that 80% of the battery power is remaining.

In order to indicate to a user an indication of the received signal strength from the transmitter, the second LED will turn on for ½ of a second. All of the LEDS will then turn off for one second. Following, depending upon the received signal strength remaining, one or more of the LEDs will turn on twice in ¼ second intervals. As above, the number of LEDs that turn on represents a percentage of signal strength received. Advantageously, this allows a user to place the receiver in a desired position and test the receiver to make sure it will receive a signal having a high enough power level that the system will properly operate.

In order to indicate which valve is currently turned on, the third LED will turn on for ½ of a second. All of the LEDS will then turn off for one second. Following, depending upon which valve is currently on, one of the LEDs will turn on twice in ¼ second intervals. The first LED indicates the first valve is on, the second LED indicates the second valve is on, the third LED indicates the third valve is on, and the fourth LED indicates the fourth valve is on.

Advantageously, by having LEDs that can convey information to a user, the receiver does not need to include a display screen. Additionally, the operation of the LEDs utilizes very little power, thus prolonging the battery life of the receiver as compare to operating a display screen.

Figure 13:
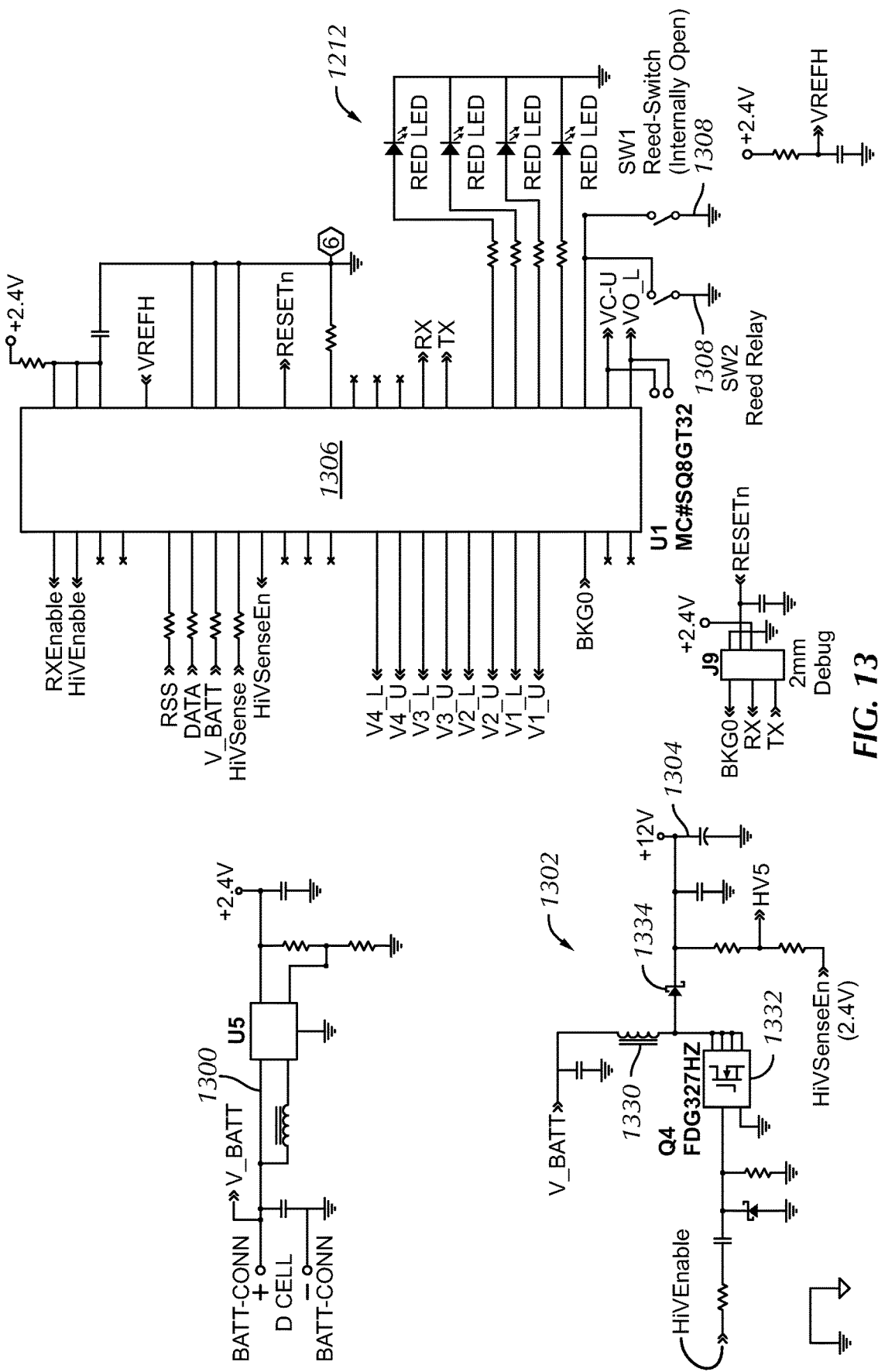
FIGS. 13-15 are collectively a circuit diagram illustrating the receiver shown in FIG. 1 in accordance with one embodiment.
Figure 14:
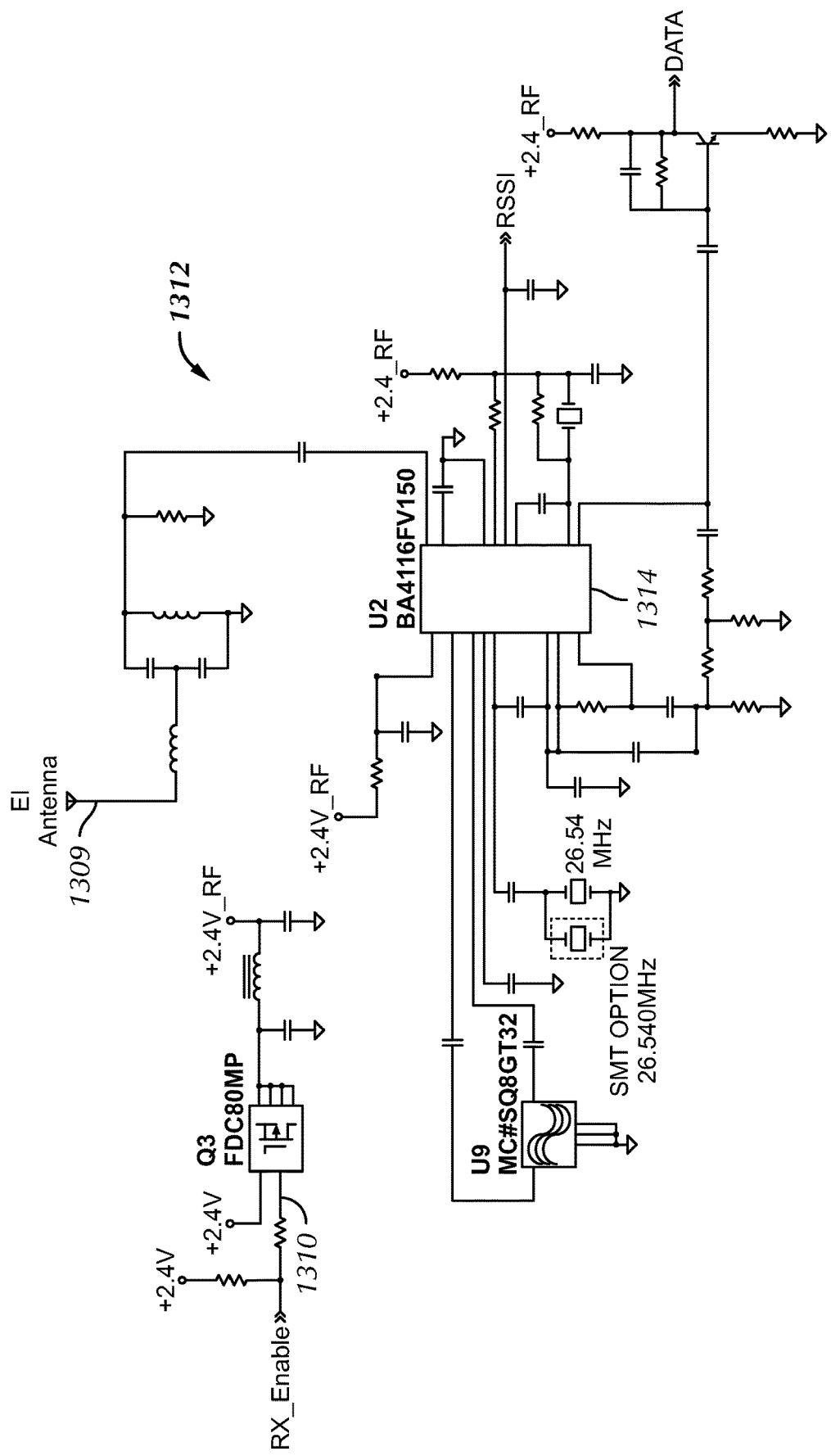
Figure 15:
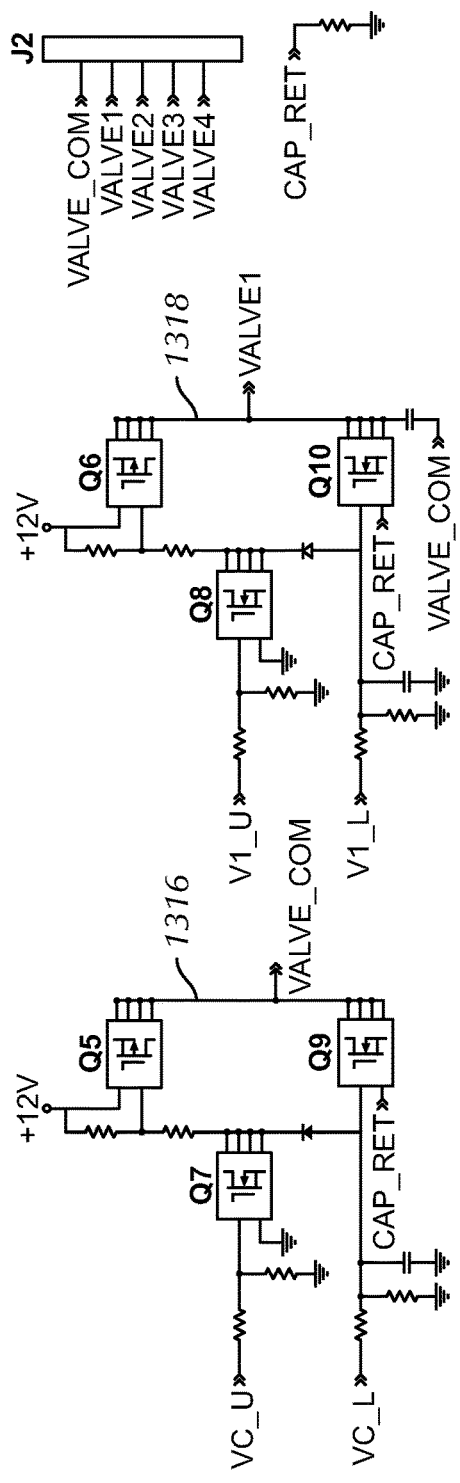
Figure 15:
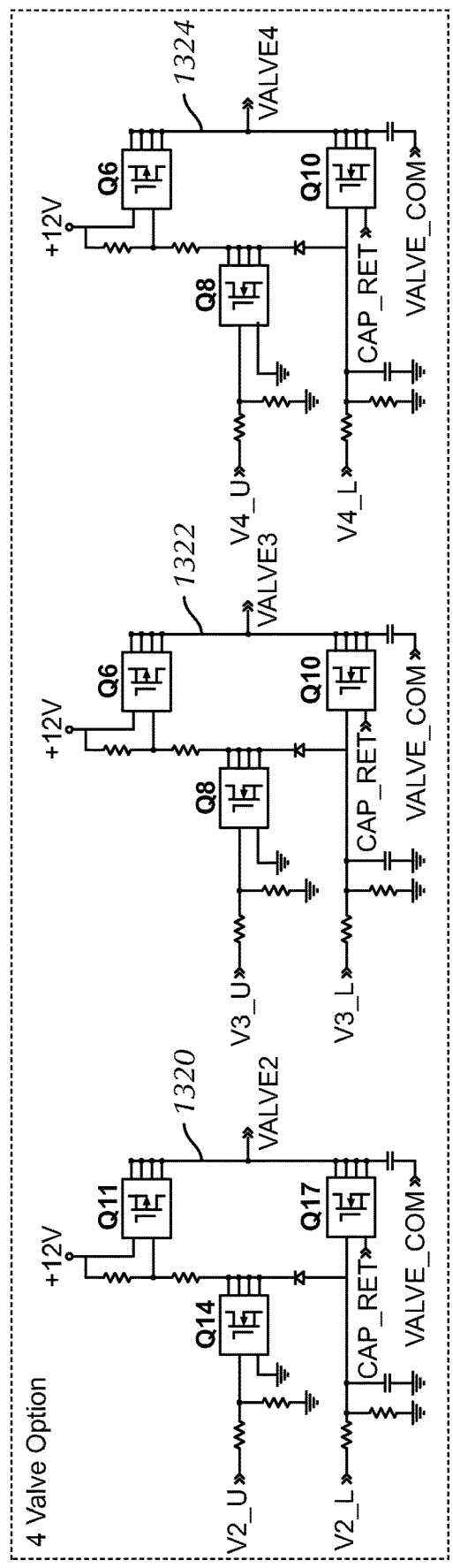

Referring to FIGS. 13-15, a circuit diagram is collectively shown illustrating the receiver (e.g., the receivers of FIGS. 1, 2, 3, 31 and 32) in accordance with one embodiment. Shown in FIG. 13 is a battery regulator circuit 1300, a capacitor charging circuit 1302 (also referred to as a station activation circuit or simply, an activation circuit) including a discharge capacitor 1304, an inductor 1330, a switch 1332, and a diode 1334. FIG. 13 also illustrates a controller 1306 (such as a microcontroller including a processor and firmware) and a magnetic switch 1308. Shown in FIG. 14 is an antenna 1309, an enabling circuit 1310 and an radio frequency (RF) circuit 1312 including an 27 MHz chip 1314. Shown in FIG. 15 is a common solenoid activation circuit 1316, a first solenoid activation circuit 1318, a second solenoid activation circuit 1320, a third solenoid activation circuit 1322 and a fourth solenoid activation circuit 1324. A single valve receiver only includes the common solenoid activation circuit 1316 and the first solenoid activation circuit 1318. A four valve receiver includes all of the circuitry shown.

The battery regulator 1300 receives power from a battery, for example, a D-cell battery. Other types of batteries are used in alternative embodiments, however, a D-cell battery is readily available to an average consumer and also stores enough power to ensure the receiver will function for at least one year without having to change the battery. The battery provides operational power to the entire receiver and also power to charge the discharge capacitor 1304. The capacitor charging circuit 1302 receives power from the battery and charges the discharge capacitor 1304 to at least 7 volts, and preferably to 12 volts. The controller 1306 controls the charging of the discharge capacitor 1304. The discharge capacitor 1304 is charged to at least 7 volts, and preferably to 12 volts, so that an activation pulse having enough voltage and current is output from the receiver to trigger a latching solenoid that operates an irrigation valve. In this manner, a D-cell battery (1.5 volt battery) can be utilized to control a latching solenoid. The controller 1306 also provides signaling to drive the LEDs 1212 (generically referred to as indicator lights).

In several embodiments, a D cell battery is used. However, a D cell battery and similar low voltage batteries (such as a AA or AAA battery) are not used in irrigation applications because the D cell battery (and AA and AAA batteries) has a voltage level of only 1.5 volts and the capacitor 1304 is to be charged to 7 volts or higher, preferably 12 or more volts in order to actuate a latching solenoid. In most irrigation applications, a latching solenoid will latch when provided a pulse from a capacitor charged to 7 volts; however, at this voltage level, it is unreliable. Thus, most applications charge a capacitor to at least 7 volts, more preferably to at least 10 volts, or at least 12 volts to ensure good operation of the latching solenoid. A capacitor charging circuit for known battery operated control units that activate a latching solenoid uses a 9 volt battery at a minimum. In this case, since the capacitor should be charged to at least 10 and preferably 12 volts, the 9 volt battery is used to charge two capacitors in parallel to 9 volts each. Once both capacitors are charged, the charged capacitors are switched to be in series instead of being in parallel, and then discharged. Such charging supply will provide 18 volts, which is sufficient to activate a latching solenoid. However, it has been found that a 9 volt battery does not have the energy density needed for a useful battery lifetime in a practical implementation. That is, a 9 volt battery would result in the need to change the battery frequently, which is an inconvenience to most irrigation system operators. A lower voltage battery, such as a D cell battery has a significantly higher energy density; however, is impractical to step the 1.5 volts up to even at least 7 volts, let alone at least 10 volts or at least 12 volts using the known capacitor charging supply. That is, one would have to charge at least 5 capacitors in parallel up to 1.5 volts each, then switch all 8 capacitors to a series relationship to achieve a voltage greater than 7 volts, then discharge them. To step up to 12 volts with a 1.5 volt source, one would need at least 8 capacitors in parallel then switched to series and discharged.

According to several embodiments, a low voltage (e.g., less than 7 volts), high energy density battery (e.g., greater than 10 Ampere-hours), such as a D cell battery at 1.5 volts and an energy density of 18 Ampere-hours (20 Amperehours for an industrial strength D cell) is used to charge the discharge capacitor 1304 to at least 7 volts needed to activate the latching solenoid, and preferably at least 10 or at least 12 volts. The battery is coupled to the inductor 1330 and the switch controls the flow of current through the inductor 1330 from the battery. For example, a square wave output from the controller 1306 switches the switch 1332 (e.g., a MOSFET) on and off, which drags current from the battery through the inductor 1330. When the switch 1332 is off, the voltage transient across the inductor 1330 is caught by the diode 1334 and pulled into the discharge capacitor 1304. As the switch 1330 repeatedly turns on and off, the voltage accumulates on the capacitor 1304 until it is charged to its intended level, e.g., 12 volts in this embodiment. Essentially, a boost power supply is used to step up the voltage from 1.5 volts to 12 volts. In contrast to known capacitor charging circuits in irrigation control devices operating latching solenoids, the capacitor charging circuit 1302 is inductor-based, not based on switching multiple capacitors from parallel to series.

Thus, in general terms, several embodiments provide a switched inductor-based capacitor charging circuit is provided to use a low voltage battery to charge a capacitor to a voltage at least 5 times as high as the voltage of the battery. In one embodiment, a capacitor charging circuit is provided that uses a battery having a rating of less than 7 volts, more preferably no more than 4 volts, and most preferably, no more than 2 volts and charging a capacitor to a voltage level of at least 7 volts, more preferably, at least 10 volts, or at least 12 volts in order to actuate a latching solenoid. Accordingly, in one embodiment, the voltage of the battery is between 1-2 volts. In preferred form, the battery is a D cell battery. In several embodiments, the battery is a single battery, whereas in other embodiments, the battery is one or more batteries that add to have a low voltage relative to the voltage level that a capacitor is needed to be charged to. Furthermore, a battery or batteries having an energy density of at least 10 Ampere-hours is preferred. The higher the energy density, the longer the battery life, and the less frequently the battery will need replacing. It is noted that while standard AA and AAA batteries provide 1.5 volts and can be used to charge the discharge capacitor 1304 to a level of at least 7 volts, it is preferred to use a higher energy density battery/batteries. Additionally, in preferred form, the discharge capacitor is a single capacitor. Accordingly, the capacitor charging circuit 1302 provides a circuit that allows a low voltage, high energy density battery to be used to charge a capacitor to a voltage sufficient to actuate a latching solenoid coupled to an irrigation valve.

As shown in FIG. 14, the antenna 1309 receives signals from the transmitter 102 which are input into the RF circuit 1312 and the 27 MHz chip 1314. The enabling circuit 1310, which is activated by the controller 1306, provides power to the RF circuit 1312 only when the controller is attempting to receive signals. As described herein below, the RF circuit 1312 consumes a large amount of power, thus, the RF circuit 1312 is only on for a short listening period before going into a longer sleeping period. For example, the RF circuit 1312 will attempt to receive a signal from the transmitter 102 for four seconds and then enter a sleep mode for sixteen seconds. In this manner, the life of the battery is greatly extended. The output from the RF circuit 1312 is input to the controller 1306.

Additionally coupled to the controller 1306 is the magnetic switch 1308. The magnetic switch 1308 is, for example, a reed switch. As shown below with reference to FIG. 29, a magnet is used to close the reed switch. When the reed switch is closed, the receiver is in learning mode. When in learning mode the receiver looks for a learn signal from a transmitter 102. Upon receipt of the learn signal from the transmitter, a specific code contained in the learn signal is stored in the receiver. The code provides a transmitter identification and also a station identification that corresponds to a watering station or zone for the irrigation system. For example, the transmitter will transmit a learn signal for a first watering station or zone. During transmission of the signal, if the receiver is in the learning mode, it will be paired with the transmitter and the first watering zone. Thereafter, when the transmitter sends a signal (e.g., a wireless activation signal) that indicates that the first watering zone should be turned on, the receiver will send an activation signal to a solenoid. It is noted that the same transmitter will also send out wireless activation signals for other stations, and while the receiver is paired to the transmitter, the receiver only acts on those wireless activation signals that have the same code (transmitter and station/valve identification). The controller 1306 can be switched to a different zone by closing the reed switch again and sending out a new learn signal from the transmitter.

It is noted that while preferred embodiments used a magnetic switch, other types of switches may be used. For example, since the receiver is intended to be located near moisture, the receiver housing is watertight in several embodiments. Accordingly, the switch 1308 may be any switch sealed within the watertight receiver housing and actuatable from outside of the watertight receiver housing, the switch for placing the receiver in the learn mode. While a magnetic switch, such as a reed-switch, is used on some embodiments, a push button switch located underneath a depressible portion of the watertight housing is used in other embodiments. The magnetic switch is used in preferred form to prevent accidental entry to learn mode by touching or handling the receiver.

Referring to FIG. 15, the common solenoid activation circuit 1316, the first solenoid activation circuit 1318, the second solenoid activation circuit 1320, the third solenoid activation circuit 1322 and the fourth solenoid activation circuit 1324 form H-bridges that turn on or off a latching solenoid. As described above, a single zone receiver only includes the common solenoid activation circuit 1316 and the first solenoid activation circuit 1318. A four zone receiver includes the common solenoid activation circuit 1316, the first solenoid activation circuit 1318, the second solenoid activation circuit 1320, the third solenoid activation circuit 1322 and the fourth solenoid activation circuit 1324. In order to turn on, for example, a first latching solenoid, a 12 volt pulse signal that comes from the discharge capacitor 1304 is sent over the output of the first solenoid activation circuit 1318. In order to turn off the first latching solenoid, the 12 volt pulse signal is sent to the latching solenoid from the output of the common solenoid activation circuit 1316. In a four zone receiver, the other zones function in the same manner.

Figure 16:
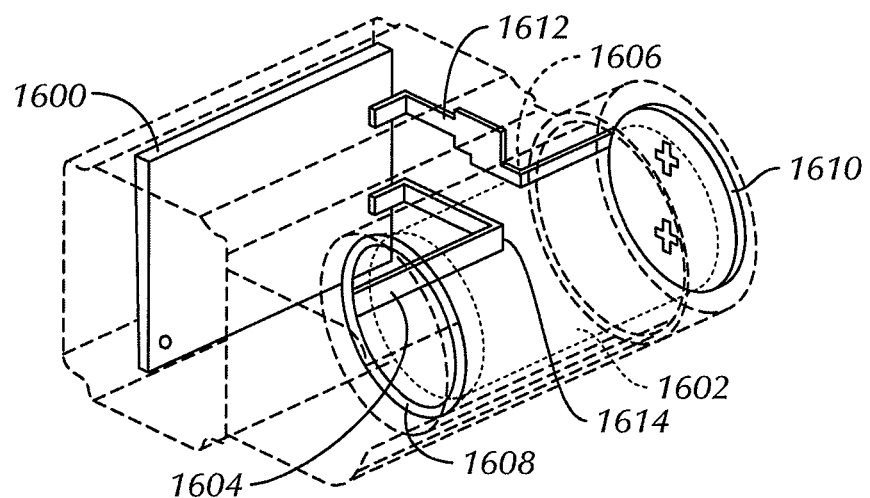
FIG. 16 is a diagram illustrating metal contacts for connecting a battery to a circuit board of the receiver shown in FIG. 12 in accordance with one embodiment.

Referring to FIG. 16, a diagram is shown illustrating the metal contacts for connecting a battery to a circuit board of the receiver shown in FIG. 12 in accordance with one embodiment. Shown is a circuit board 1600, a battery 1602, a negative battery contact 1604, a positive battery contact 1606, a spring 1608, an end cap contact 1610, a positive printed circuit board contact 1612, and a negative printed circuit board contact 1614. The plastic molded receiver is not shown.

The battery 1602 includes a positive end and a negative end. When inside the battery housing portion (shown in FIG. 12), the positive end of the battery touches the end cap contact 1610. The end cap contact 1610 is attached to the cap shown in FIG. 12. The negative battery contact 1604 touches the spring 1608. The end cap contact 1610 is coupled to the positive battery contact 1606. The positive battery contact 1606 is coupled to the positive printed circuit board contact 1612 which is coupled to the printed circuit board 1600. The negative end of the battery touches the spring 1608 which is coupled to the negative battery contact 1604. The negative battery contact 1604 is coupled to the negative printed circuit board contact 1614 which is coupled to the printed circuit board 1600. The battery 1602 provides power to electrical components on the printed circuit board 1600 of the receiver.

Advantageously, this embodiment provides one means for connecting the printed circuit board 1600 (housed in the circuitry housing portion shown in FIG. 12) to the battery 1602 (housed in the battery housing portion shown in FIG. 12). This embodiment removes the need to have wire contacts manually placed through holes in the receiver molding that go from the battery housing to the circuitry housing portion. Further it prevents the need for soldering wires to the printed circuit board 1600 after the printed circuit board 1600 is placed within the circuitry housing portion. This greatly reduces manufacturing costs.

The negative battery contact 1604, the positive battery contact 1606, the spring 1608, the end cap contact 1610, the positive printed circuit board contact 1612, and the negative printed circuit board contact 1614 are all made from conductive material, such as for example, metal.

Figure 17:
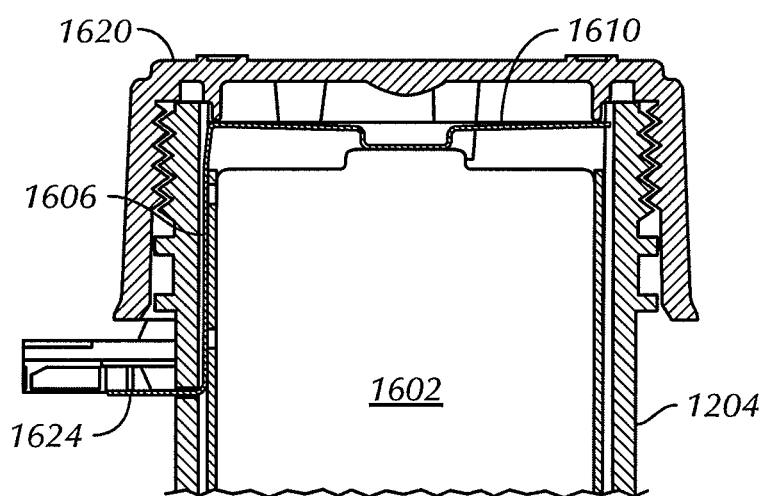
FIG. 17 is a cross sectional diagram illustrating a top portion of the receiver shown in FIG. 12 in accordance with one embodiment.

Referring to FIG. 17, a cross sectional diagram is shown illustrating a top portion of the receiver shown in FIG. 12 in accordance with one embodiment. Shown is an end cap 1620, the end cap contact 1610, the battery 1602, the battery housing 1204, and a hole 1624 in the battery housing 1204.

The end cap 1620 is attached to the end cap contact 1610. The positive end of the battery 1602 touches the end cap contact. The end cap contact 1620 also touches the positive battery contact 1606. The positive battery contact goes through the hole 1624 in the battery housing portion 1204. As shown in FIG. 16, the positive battery contact 1606 is coupled to the positive printed circuit board contact 1612 within the circuitry housing portion that contains the circuit board.

Figure 18:
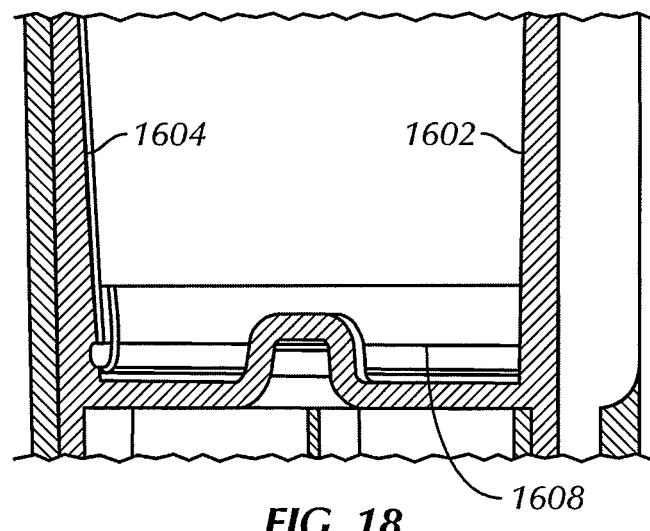
FIG. 18 is a cross sectional diagram illustrating a bottom portion of the receiver shown in FIG. 12 in accordance with one embodiment.

Referring to FIG. 18, a cross sectional diagram is shown illustrating a bottom portion of the receiver shown in FIG. 12 in accordance with one embodiment. Shown is the battery 1602, the spring 1608, the battery housing 1204 and the negative battery contact 1604.

The spring 1608 makes contact with a negative end of the battery 1602. The spring 1608 is connected to a bottom inside portion of the battery housing 1204. The negative battery contact 1604 touches the spring 1608. The negative battery contact 1064 also goes through a hole in the battery housing 1204 similar to the hole shown above in FIG. 17.

Figure 19:
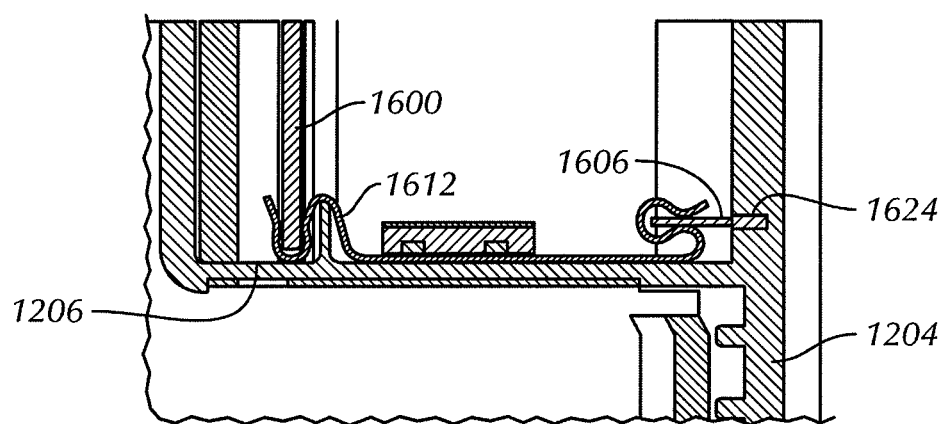
FIG. 19 is a cross sectional diagram illustrating a portion of the circuitry housing portion of the receiver shown in FIG. 12 in accordance with one embodiment.

Referring to FIG. 19, a cross sectional diagram is shown illustrating a portion of the circuitry housing portion shown in FIG. 12 in accordance with one embodiment. Shown is the circuitry housing portion 1206, the circuit board 1600, the battery housing portion 1204, a positive printed circuit board contact 1612, a positive battery contact 1606 and a hole in the battery housing portion 1204 that extends from the battery housing portion 1204 to the circuitry housing portion 1206.

The positive battery contact 1606 is placed through the hole in the battery housing portion 1204 and contacts the positive printed circuit board contact 1612. The circuit board 1600 also contacts the positive printed circuit board contact 1612. Both ends of the positive printed circuit board contact 1612 have curved portions that act as a clasp and keep a secure contact between the positive battery contact 1606 and the positive printed circuit board contact 1612 and between the printed circuit board 1600 and the positive printed circuit board contact 1612.

Advantageously, the metal contact design described herein with reference to FIGS. 16-19 eliminates the need for having wires that must be soldered to the circuit board and need to travel from the battery housing portion 1204 to the circuitry housing portion 1206.

Figure 20:
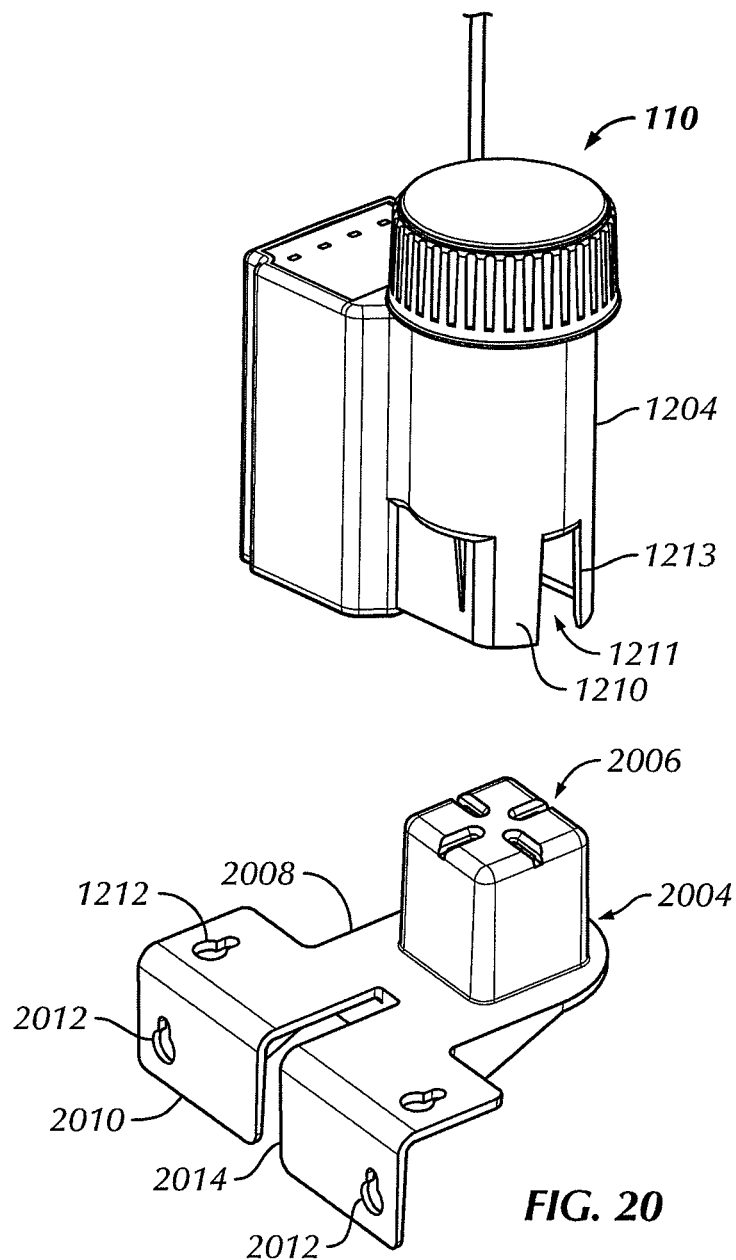
FIG. 20 is a perspective diagram illustrating a receiver and a mounting bracket in accordance with one embodiment.

Referring to FIG. 20, a perspective diagram is shown illustrating a receiver 110 and a corresponding mounting bracket in accordance with one embodiment. Shown is the receiver 110 including the mounting portion 1210 that forms the receptor portion 1211 (generically referred to as a mating portion) and including the slot 1213 (generically referred to as an opening). The mounting bracket 2004 includes a square keying portion 2006, a top face 2008 and a side face 2010. The top face and the side face both include a plurality of mounting holes 2012. Additionally, the mounting bracket includes a mounting groove 2014. As is shown in FIGS. 22 and 23, the mounting groove 2014 aids in mounting the receiver 110 to ribs inside of a valve box or its lid.

Figure 21:
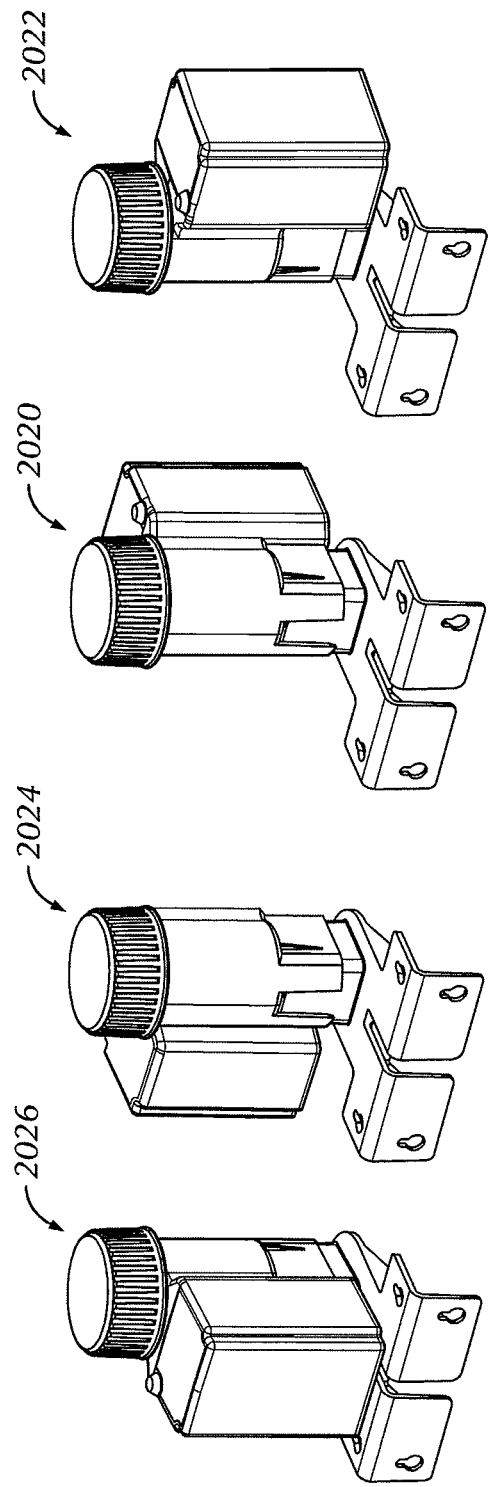
FIG. 21 is a perspective diagram illustrating multiple different mounting options for the receiver and the mounting bracket.

The square keying portion 2006 is shaped to friction fit into or mate to the receptor portion 1211 of the receiver 2000 in four different positions, thus providing multiple mounting options for a user of the receiver 110 (See FIG. 21). For example, the keying portion 2006 forms a male portion that inserts into the receptor portion 1211. The interior surfaces of the mounting portion 1210 of the receiver 110 contact the exterior surfaces of the keying portion 2006 to frictionally hold the receiver 110 in place to the bracket 2004. The mounting bracket 2004 allows a user to easily mount the receiver 110 inside of a valve box or valve box lid, on the side of a wall, on a fence, on a post, or on any other convenient surface. In an alternative embodiment, the receiver 110 can be mounted directly onto an irrigation solenoid that is inside or outside of a valve box (see FIG. 33-34 described below). The plurality of mounting holes 2012 allow the mounting bracket to be nailed, screwed or otherwise attached to, for example, a wooden, plastic or metal surface.

Referring to FIG. 21, a perspective diagram is shown illustrating multiple different mounting options for the mounting bracket 2004. Shown is a first mounting position 2020, a second mounting position 2022, a third mounting position 2024, and a fourth mounting position 2026. The square keying portion 2006 of the mounting bracket 2004 allows the mounting bracket 2004 to be coupled to the receiver 110 in the four mounting positions. The shape of the square keying portion 2006 and the mounting portion 1210 forming the receptor portion 1211 of the receiver 2002 can be changed in alternative embodiments to allow for a greater or lesser number of mounting options.

Figure 22:
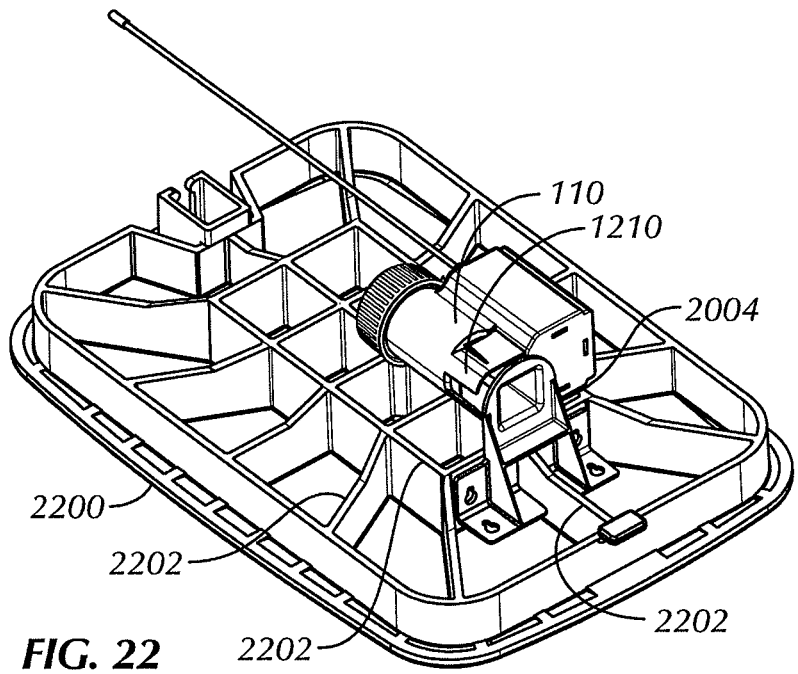
FIG. 22 is a perspective diagram of a receiver mounted to a valve box lid to be fit to a standard valve box in accordance with one embodiment.
Figure 23:
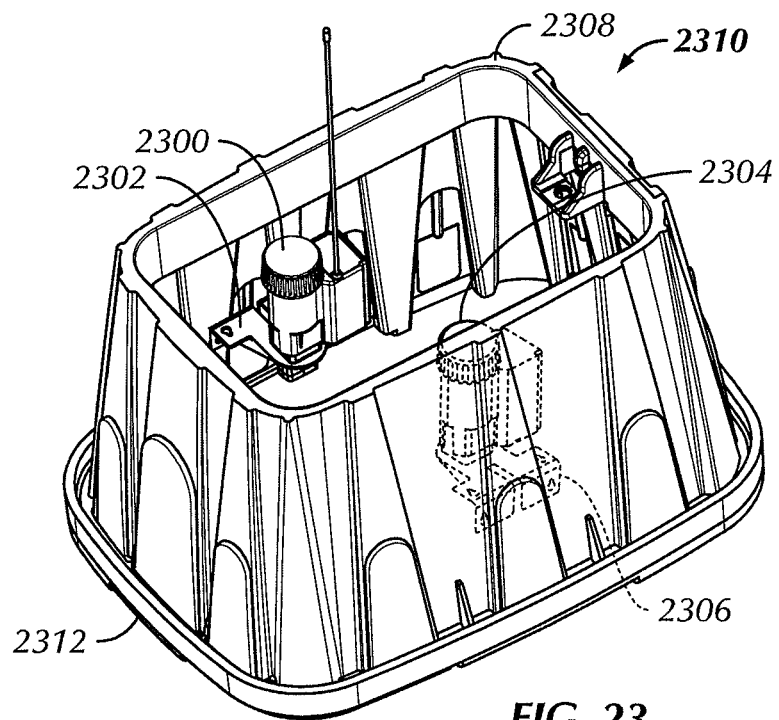
FIG. 23 is a perspective diagram of two receivers mounted inside a valve box in accordance with one embodiment.

Referring to FIG. 22, a perspective diagram is shown of a receiver mounted to a valve box lid in accordance with one embodiment. Shown is a lid 2200 adapted to be fit over a standard valve box, the lid 2200 including a plurality of ridges 2202 or ribs. Also shown is the receiver 110 and the mounting bracket 2004.

The mounting groove 2014 of the mounting bracket 2004 fits onto any of the plurality of ridges on the bottom of the lid 2200. As shown, the receiver 110 is mounted in a horizontal position along the bottom of the lid 2200. Alternatively, the receiver 110 can be mounted in a vertical position, for example, to the inside surface of a valve box, such as is shown in FIG. 23.

Referring to FIG. 23, a perspective diagram is shown of two receivers mounted inside a valve box in accordance with one embodiment. Shown is a valve box 2310, a first receiver 2300, a first mounting bracket 2302, a second receiver 2304, a second mounting bracket 2306, an opening 2308 at a top surface of the valve box 2310 and a bottom edge or flange 2312 of the valve box 2310.

The first receiver 2300 and the second receiver 2304 are both mounted in a vertical position to side walls of the valve box 2310. Although not shown, the antennas of the first receiver 2300 and the second receiver 2304 will extend to and touch the lid (not shown in FIG. 23) of the valve box. Advantageously, the antennas are flexible and thus will bend and extend along the lid of the valve box 2310.

Generally, valve boxes are slightly buried in the ground (e.g., the bottom flange 2312 is underground) with the opening 2308 formed at the top periphery of the valve box 2310 extending slightly above the ground plane. The lid (e.g., the lid 2200 of FIG. 22) is fit into the opening 2308. For example, the lid 2200 of FIG. 22 is turned upside down from its illustrated orientation and positioned in the opening 2308. By mounting the first receiver 2300 and the second receiver 2304 in the vertical position to the side walls of the valve box 2310, the antennas of the receivers extend upward and contact an interior portion of the lid and preferably bend and extend along the top of the lid in a horizontal direction. This allows the receiver to receive signals from the transmitter (shown in FIG. 1) having a much higher signal strength as compared to if the antenna was completely below ground.

As shown, the mounting bracket allows for one or more receivers to be easily mounted inside of valve box in accordance with one embodiment of the irrigation system.

Figure 34:
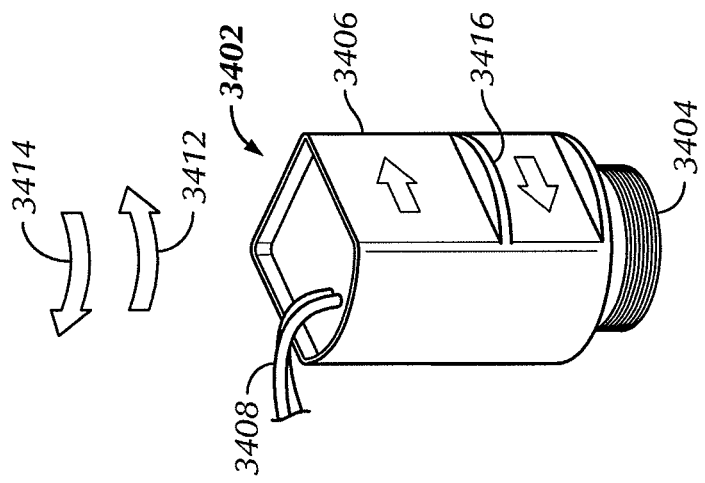
FIG. 34 is a conventional latching solenoid unit.
Figure 33:
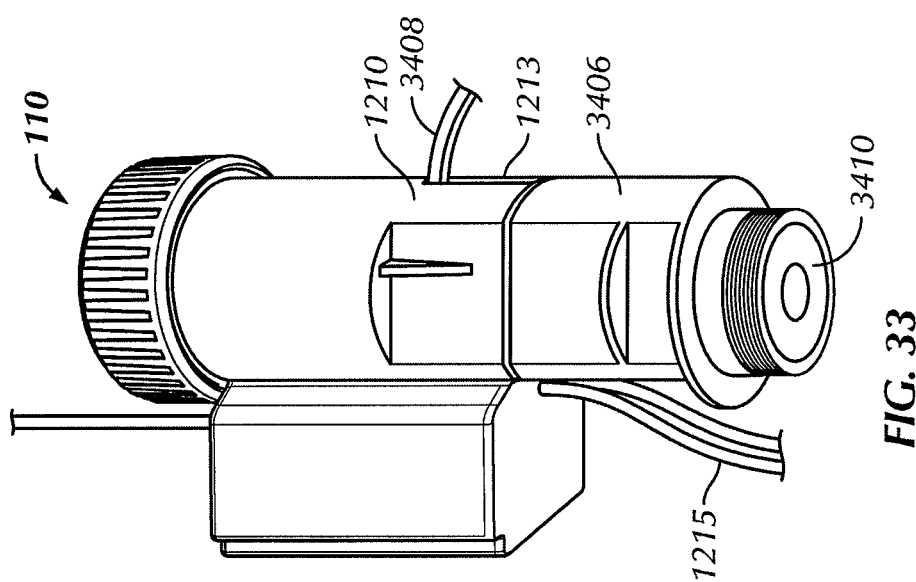
FIG. 33 is one embodiment of a receiver having a mounting portion defining a receptor portion adapted to receive and mount to a conventional latching solenoid unit according to one embodiment.

Referring next to FIGS. 33 and 34, in accordance with several embodiments, the mounting portion 1210 of the receiver that forms the receptor portion 1211 is adapted to fit over a portion of a standard latching solenoid housing. FIG. 34 illustrates a conventional solenoid unit 3402 having a threaded end 3404, a top end 3406 opposite the threaded end 3404, and electrical connection wires 3408. As is well known, the threaded end 3404 threads to an irrigation valve (not shown). The electrical connection wires 3408 are for receiving a pulse of power that will mechanically actuate the latching solenoid between two states. This actuation moves a plunger 3410 (see in FIG. 33) in and out of the solenoid unit housing to open and close an irrigation valve. By physically turning the solenoid unit 3402 one quarter turn in the direction of arrow 3412, the latching solenoid is actuated on, while physically turning the solenoid unit one quarter turn in the direction of arrow 3414, the latching solenoid is actuated off.

As seen in FIG. 33, the receptor portion (1211) formed by the mounting portion 1210 of the receiver 110 is shaped to frictionally receive and engage the top end 3406 of the solenoid unit 3402. This allows the receiver 110 to be directly mounted to the solenoid unit 3402. The slot 1213 (generically referred to as an opening) in the mounting portion 1210 allows the electrical connection wires 3408 to extend out of the receptor portion for easy electrical connection to electrical output wires 1215 of the receiver 110. In this embodiment, the top end of the solenoid unit 3402 extends into the receptor portion 1211 and stopped by ridge 3416 on the solenoid unit housing. Since the receiver 110 is friction fit to the solenoid unit 3402, the receiver 110 itself may be physically rotated a quarter turn in either direction and the solenoid unit 3402 will also rotate in order to manually actuate the solenoid unit on and off. It is noted that the particular shape of the top end 3406 and the receptor portion 1211 may be varied depending on the implementation.

Figure 24:
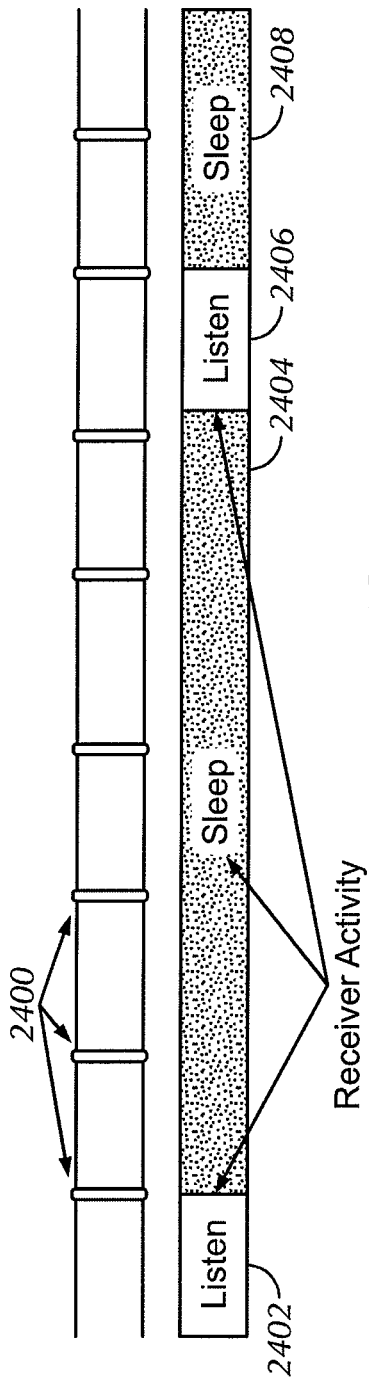
FIG. 24 is a diagram illustrating signaling from the transmitter to the receiver in accordance with one embodiment.

Referring to FIG. 24, a diagram is shown illustrating signaling from the transmitter to the receiver in accordance with one embodiment. Shown is a plurality of transmitted messages 2400, a first listening period 2402, a first sleep period 2404, a second listening period 2406 and a second sleep period 2408.

In accordance with one embodiment, transmitted messages are sent from the transmitter in approximately 3.5 second intervals on average. Additionally, the length of time between messages is randomized to be between 3 and 4 seconds in order to ensure the receiver will properly receive a message taking into consideration of the possibility of collisions with other communicating devices (possibly even other co-located transmitters, such as in FIG. 32). Thus, this random time interval between transmission of messages (e.g., wireless activation signals) prevents repetitive collision of signals. The format of the transmitted messages according to several embodiments will be discussed in detail below with reference to FIG. 28. In general, the messages transmitted by the receiver indicate to a receiver that a valve should be turned on. The same message is repeatedly sent by the transmitter approximately every 3.5 seconds, ensuring the receiver will be able to receive the message and turn on the valve. Again, in preferred form, the time interval between re-transmissions is randomized between a plurality of discrete time intervals. For example, in one embodiment, three different time intervals are available, whereas in another embodiment, 11 time intervals between 3 and 4 seconds are available. Given the sleep period and accounting for the possibility of other co-located transmitters, in preferred form, the range of 3-4 seconds provides enough of an interval to spread out potentially colliding signaling while ensuring that the message will be heard by the receiver. In one embodiment, briefly referring back to the circuit diagram of FIG. 8, the controller 804 of the transmitter 102 periodically samples the status of the input connectors (connector 810) by checking the status of the input pins 807 of the controller 804. When a given input pin 807 is high (as a result of the activation sensor circuitry 813), this indicates that the irrigation controller has activated the station and that a wireless activation signal should be sent to the appropriate receiver. The controller 804 then formats a message (see FIGS. 28-29) and then causes the message (i.e., the wireless activation signal) to be wirelessly transmitted. The controller 804 sets a random time delay selected from one of a plurality of time delays. When the time delay expires, the controller 804 re-samples the input pins 807. If the given pin is still high, the controller 804 formats another message (e.g., the same message), sets a random time delay and causes the message to be transmitted. Once the time delay expires, the input pins 807 are sampled again, and so on. This process continues as long as an input pin is high (i.e., as long as the irrigation controller 100 outputs an activation signal corresponding to a given station). It is noted that the techniques of randomizing the transmission interval of transmitted wireless signaling may be applied to the transmitters described herein and also generically to any irrigation control equipment that transmits wireless signals to a receiver. Again, the random transmit interval ensures that the transmitter transmits at irregular intervals so as to reduce the likelihood of repetitive collisions.

Turning to the receiver side, the receiver 110 is on during the first listening period 2402 during which the receiver attempts to detect a message from the transmitter 102. After the first listening period 2402 the receiver sleeps (i.e., enters a power saving mode in which the RF circuit shown in FIG. 14 is not supplied power) during the first sleep period 2404 before turning back on during the second listening period. In accordance with one embodiment, the first listening period 2402 and the second listening period 2406 are approximately 4 seconds in length and the first sleep period 2404 and the second sleep period 2408 are approximately between 14 and 20 seconds. Most of the battery power consumed by the receiver occurs when the receiver is listening for a message. Therefore, by only having the receiver on during the listening periods, the battery life of the receiver is greatly increased.

With a few exceptions, the receiver only listens for every fifth message sent from the transmitter. The messaging scheme depicted helps to ensure that the receiver properly receives messages from the transmitter while also conserving battery power. It should be understood that different timing schemes may also be used. For example, the transmitter can transmit messages more or less frequently and the listening and sleeping periods can be modified to optimize a desired tradeoff between conservation of battery power and the receipt of messages from the transmitter.

Figure 25:
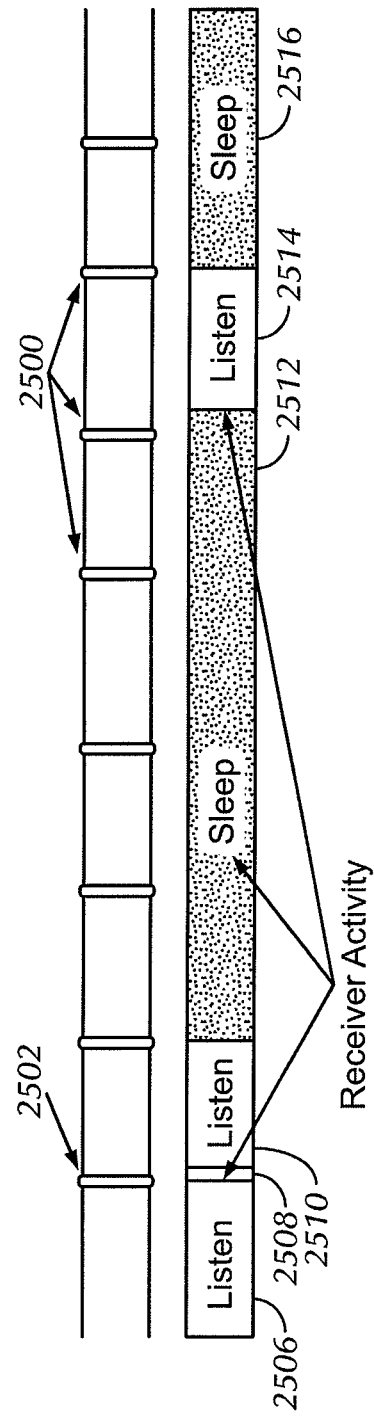
FIG. 25 is a diagram illustrating receipt of a corrupted message in accordance with one embodiment.

Referring to FIG. 25, a diagram is shown illustrating receipt of a corrupted message in accordance with one embodiment. Shown is a plurality of transmitted messages 2500, a corrupted message 2502, a first listening period 2506, a first sleep period 2508, a second listening period 2510, a second sleep period 2512, a third listening period 2514, and a third sleep period 2516.

During the first listening period 2506, the receiver detects the corrupted message 2502. Generally after the first listening period 2506, the receiver will sleep for a predetermined amount of time (e.g., 20 seconds). However, because the corrupted message 2502 was received, the receiver enters the second listening period 2510 after a very short period of sleeping (i.e., the first sleep period 2508). For example, the first sleep period is ¼ of a second in the present embodiment. In preferred form, the transmitter sends messages every 3-4 seconds, thus, because the transmitter sent a message that could not be decoded by the receiver, the receiver will enter the second listening period 2510 in order to attempt to receive a non-corrupted message as soon as possible. After receiving a non-corrupted message, the receiver will return to normal operation of listening in 4 second intervals with a period of sleep in between.

Figure 26:
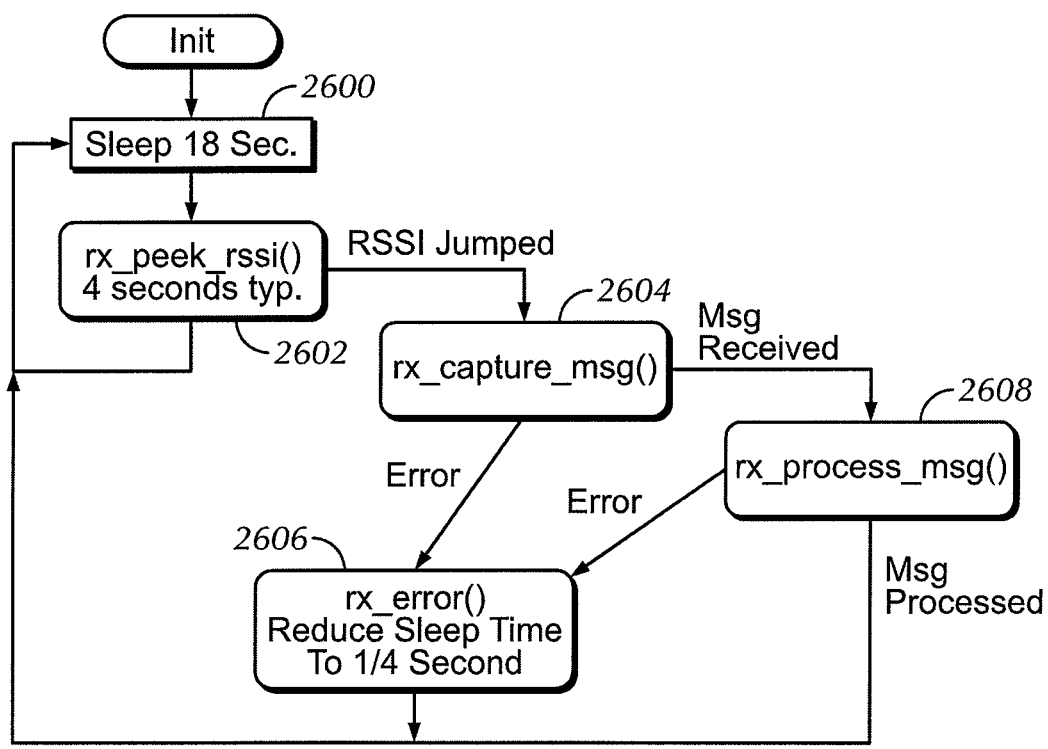
FIG. 26 is a flow diagram illustrating the receiver checking for messages from the transmitter in accordance with one embodiment.

Referring to FIG. 26, a flow diagram is shown illustrating the receiver checking for messages from the transmitter in accordance with one embodiment. The flow diagram illustrates the process of the receiver attempting to detect a message from the transmitter while using a small amount of the battery power.

In step 2600, the receiver sleeps, for example, for approximately between 14 and 20 seconds. In step 2602, the receiver listens for a message for and checks for a received signal strength. If the received signal strength is above a threshold or jumps from a previous value, the receiver moves to step 2604 and attempts to capture a message. If the received signal strength is below the threshold, the receiver proceeds to step 2600. In step 2604, if there is an error capturing the message, the receiver proceeds to step 2606 and sleeps for ¼ of a second. After ¼ of a second, the receiver returns to step 2602. When in step 2604, if the message is properly received the receiver proceeds to step 2608. In step 2608, the message is processed. If there is an error processing the message, the receiver proceed to step 2606 and if the message is properly processed, the receiver returns to step 2600.

There are a number of reasons that the receiver can have an error during either step 2604 or 2608. For example, the receiver could receive a large amount of noise at the transmission frequency (e.g., 27 MHz), the receiver turns on during the middle of a transmitted message, or two or more transmitters are active at the same time. By only sleeping for ¼ of a second after the error condition, the receiver will more likely receive a valid message during the next listening period.

Figure 27:
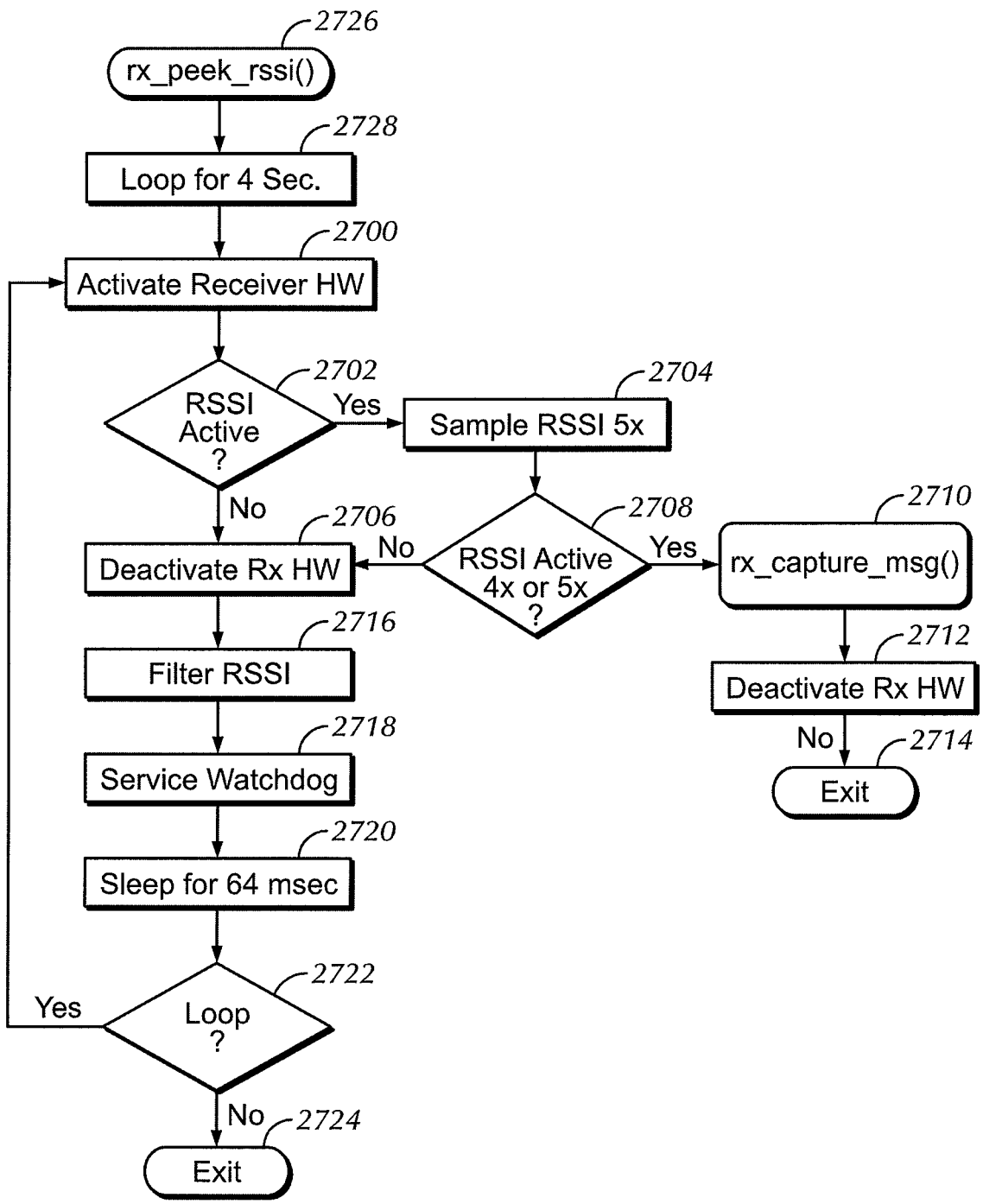
FIG. 27 is a flow diagram illustrating the operation of the receiver during the listening period shown in FIG. 26 in accordance with one embodiment.

Referring to FIG. 27, a flow diagram is shown illustrating the operation of the receiver during the listening period shown in FIG. 26 in accordance with one embodiment. FIG. 27 illustrates a process of the receiver during step 2602 of FIG. 26.

The function 2726 executes in order for the receiver to listen for a message to check for the received signal strength. The function 2726 loops for four seconds 2728 before exiting.

In step 2700, the receiver hardware is activated. In step 2704, if a received signal strength indicator is active (step 2702), the receiver samples the signal at five times the data rate. In step 2702, if the received signal strength indicator is not active, the process continues to step 2706. In step 2708, if the received signal strength indicator is active, the receiver attempts to capture a message from the receiver in step 2710. After attempting to capture the message the hardware is deactivated in step 2712 and the receiver exits the process in step 2714.

In step 2710, the receiver captures a message by sampling a data pin at five times the data rate. A 4 KHz timing signal is used for the data sampling. The DC level and the amplitude of the signal at the data pin will vary for the first 50 milliseconds after the receiver is activated. During this period, a simple threshold is not sufficient to convert the A/D readings to 1's and 0's. The receiver uses a high-pass filter to detect the edges in the A/D values. The capture routine expects to start in the header. The format of the messages from the transmitter is described below with reference to FIG. 28. The raw data stream should contain three 1's followed by a stuffed 0. The first non-bit stuffing 0 should be the start bit of the first frame of data. From here, the receiver expects to capture ten frames of data. If the framing (start and stop bits) or bit stuffing is violated at any point, the routine will exit with an error. An error anywhere in this capture cycle will cause the receiver to execute the minimum sleep cycle and process will start over.

If a complete message is received in step 2710, this routine will verify that the CRC is valid and will decode the command field of the message. If the receiver completely receives a valid valve command message from a transmitter that it is not trained to, the receiver will perform the minimum sleep cycle and start listening for another message from its transmitter. This condition will prevent the receiver from entering its normal sleep cycle. Receiving valid messages from other transmitters will raise the battery consumption at the receiver. If the receiver is in learn mode, it will ignore all message command type except for the learn command. If the receiver captures a valid learn message and the number of valves listed in the message matches the number of valves in the receiver (1 or 4), then the receiver will store the new transmitter ID and valve mask the transmitter ID to flash.

In step 2708, if the received signal strength indicator is not active, the process proceeds to step 2706. During step 2706, the receiver hardware is deactivated. In step 2716, the received signal strength indicator is filtered. In step 2718, the service watchdog clears a timer in a microprocessor within the receiver in order to keep the microprocessor operating in an orderly manner. If the timer is not cleared the microprocessor may reset and disrupt the process. Next, in step 2720, the receiver sleeps for 64 milliseconds. In step 2722, the process returns to step 2700 if the receiver has been in the listening mode for less than 4 seconds. If the receiver has been in the listening mode for more than four seconds, the process exits in step 2724.

Figures 28, 29:
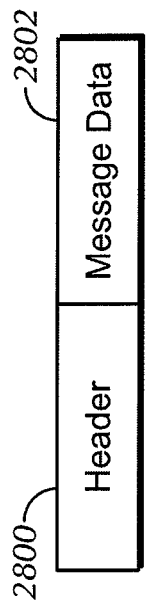
FIG. 28 is a diagram illustrating a messaging format in accordance with one embodiment.
FIG. 29 is a diagram illustrating a data portion of the message format shown in FIG. 28 in accordance with one embodiment.

Referring to FIG. 28, a diagram is shown illustrating a messaging format in accordance with one embodiment. The transmitter sends messages to the receiver in accordance with the following message scheme. Shown is a header portion 2800 of the message and a data portion 2802 of the message. Referring to FIG. 29, a diagram is shown illustrating the data portion 2802 of the message of FIG. 28 in accordance with one embodiment. Shown is a serial number 2900 (corresponding to bits 0-47), a command portion 2902 (corresponding to bits 48-51), a valve bank portion 2904 (corresponding to bits 52-55), a data portion 2906 (corresponding to bits 56-63), and an error correction portion 2908 (corresponding to bits 64-80).

It is noted that the message format of FIGS. 28 and 29 in preferred form is modulated onto a carrier signal and transmitted by radio frequency over the wireless link 116. However, prior to transmission and after reception, data formatted according to the message format exists at baseband (i.e., not modulated onto a carrier signal or waveform) and is transmitted and received by various components of the electronics of the transmitter and receiver.

The header portion 2800 is 64 bits. The header portion 2800 of the message is used as part of the receiver's message detection scheme. When the receiver is in the listening mode, the receiver attempts to detect the header portion 2800 of the message. In accordance with one embodiment, the header portion 2800 of the message is a string of all zeros, thus it can be easily detected the receiver. The data portion of the message is 80 bits and contains a transmitter identification number, a command value, a valve bank value, a valve number and error correction. Bits 0-47 are a unique 48 bit serial number that is assigned to the transmitter during manufacturing. Bits 48-51 are allocated to define sixteen different commands. Currently, only five commands are utilized. The valve bank (i.e., bits 52-55) is used to address up to 128 valves. Currently, the transmitter only controls up to 8 valves, thus all the valves are defined by bank zero. The data field (i.e., bits 56-63) is used differently depending upon the command being executed. The commands, described in more detail below, use the data bits as follows. For the CMD_VALVES, CMD_LEARN, and CMD_ERASE commands, each bit of the data field is used to identify one valve. For the CMD_LED_TEST command, the data field identifies which test mode to display. The data field is not used for the CMD_DUMP_LOG command.

As described, bits 48-51 identify specific commands. The first command (CMD_VALVES) sends out the state of all eight inputs from the transmitter. The inputs are the state of the actuation lines from the irrigation controller. The transmitter will start sending this command whenever any actuation line is active. When the valve inputs to the transmitter change from at least one input active to no active inputs, the transmitter will continue sending this command for 60 seconds to indicate that all valves should be turned off.

The second command (CMD_LEARN) is used to train receivers to the transmitter. Using the menu buttons, the user may select a single valve or a bank of four valves that should be trained. The transmitter will send out a CMD_LEARN message for 120 seconds. The data field (i.e., bits 56-63) of the CMD_LEARN message will indicate which valve or valves have been selected. Any receiver that is in LEARN mode (magnet swiped and LED's scanning) will accept a CMD_LEARN message, overwriting any previous transmitter ID and valve position information.

The third command (CMD_ERASE) is used to delete a transmitter ID from a programmed receiver. Using the menu buttons, the user may select one valve, a bank of four valves, or all eight valves to be erased. The data field is used to indicate which valve positions are affected. Any receiver that matches the transmitter ID and contains one of the valves indicated will erase its stored transmitter ID information.

The fourth command (CMD_TEST) causes all receivers with matching identification numbers to display an information pattern (e.g., signal strength, battery voltage, valve position) using the receiver's LED's. Using the menu buttons, the user may select the test pattern. The data field is used to identify which data pattern should be displayed.

The fifth command (CMD_DUMP_LOG) contains an event log stored in the flash memory. The user may select this command only by accessing the hidden service menus. Any receiver with a matching ID receiving this command will transmit its log data on the valve 1 wires at 1200 baud using standard ASCII text.

The messages sent from the transmitter are sent in accordance with the following message format. The 80 bits of message data are transmitted as 10 message frames. Each frame contains a start bit, eight data bits, and one stop bit. Start bits are a logic zero, stop bits are a logic one. The least significant bit of the least significant byte is transmitted first. The 10 message frames, 100 bits, are preceded by a header. The header consist of 60 logical stop bits, all logic ones. These 160 bits are the logical bit stream.

Additionally, the transmitted data stream must contain regular edges to guarantee message reconstruction at the receiver. Edges are forced into the bit stream using bit stuffing. If the bit stream contains three zeros in a row, a 'stuffed' one is inserted into the bit stream following the third zero. Likewise, if the bit stream contains three ones in a row, a 'stuffed' zero is inserted after the third one. The start and stop bits are used as two exceptions to normal bit stuffing:

Case 1-If the stop bit would be the third consecutive one, a zero is not stuffed. A start bit, a logic zero, will always follow a stop bit, so that edge is always guaranteed.

Case 2-If the three bits preceding a stop bit are all zeros, a one is not stuffed. The next bit will always be the stop bit, a logic one, so that edge is always guaranteed.

The stuffed bits guarantee that the RF bit stream will never stay in the same state for more than 3 bit times. The bit stuffing increases the transmitted bit stream to roughly 200 bits total.

Therefore, after the message is properly formatted, the header will be 80 bits and the data portion of the message will be approximately 120 bits depending upon the data being transmitted.

Figure 30:
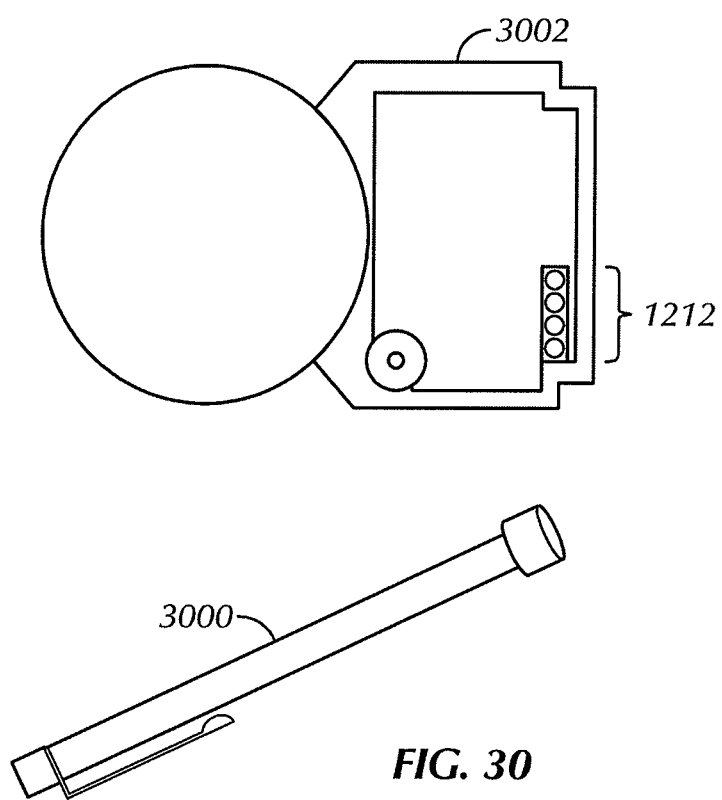
FIG. 30 is a diagram illustrating the receiver with a magnet adjacent to the receiver.

Referring to FIG. 30, a diagram is shown illustrating the receiver with a magnet adjacent to the receiver. Shown is a magnet 3000 and a receiver 3002. As described above in order to put the receiver 3002 into learning mode, the magnet 3000 is used to close reed switches (e.g., the magnetic switch 1308 shown in FIG. 13) that are inside the circuitry housing portion 1206 of the receiver 3002. As described above, this magnetic switch 1308 or proximity switch can be generically referred to as a switch sealed within the watertight receiver housing and actuatable from outside of the watertight receiver housing, the switch for placing the receiver in the learn mode. In one embodiment, the indicator lights 1212 light to indicate that the receiver is in learning mode. The receiver 3002 then searches for a learn signal from the transmitter. If the learn signal is received, the receiver is then paired to a zone within the irrigation system and will respond to other control signals from the transmitter corresponding to the specific watering zone. When a transmitter is sending out a learning signal, any receiver that is in learning mode and receives the learning signal will be paired to the watering zone corresponding to the learning signal. In this manner, more than one receiver can be paired to the same watering zone of the irrigation controller (see FIG. 31, for example).

Several embodiments, as implemented and described herein are provided. One embodiment can be characterized as an irrigation system including a wireless link comprising a transmitter coupled to an irrigation controller; and a receiver, adapted to receiver a first activation signal from the transmitter, wherein the receiver sends a second activation signal to a solenoid for controlling the operation of a valve within a watering zone. In one variation of this embodiment, the receiver is powered by a battery. In another variation of the embodiment, the solenoid is a latching solenoid.

Another embodiment can be characterized as an irrigation system including a wireless link comprising an irrigation controller having at least one activation line; a transmitter coupled to the irrigation controller through the activation line, wherein the transmitter sends an activation signal upon receiving a signal from the irrigation controller over the activation line; and a receiver that activates a latching solenoid upon receipt of the activation signal from the transmitter.

A subsequent embodiment can be characterized as a wireless receiver for controlling activation of a latching solenoid comprising an antenna for receiving an activation signal; a controller coupled to the antenna for processing the activation signal; and a battery coupled to the controller and providing power to the controller, wherein the battery provides power to activate a solenoid based upon the processed activation signal. A variation of this embodiment includes a capacitor charging circuit for charging a capacitor to a voltage greater than a voltage of the battery. In another variation of this embodiment, the capacitor sends an activation pulse to the solenoid (e.g., a latching solenoid).

Yet another embodiment includes a wireless transmitter for use in an irrigation system comprising a transmitter controller coupled to an irrigation controller, the transmitter controller for processing a first activation signal from the irrigation controller; and an antenna for sending a second activation signal to a receiver that controls actuation of a solenoid based on the processed first activation signal.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

While the invention herein disclosed has been described by means of specific embodiments and applications thereof, other modifications, variations, and arrangements of the present invention may be made in accordance with the above teachings other than as specifically described to practice the invention within the spirit and scope defined by the following claims.

We claim:

1. A method for use in controlling irrigation comprising:
   executing, by an irrigation controller, an irrigation schedule defining watering days, start times and watering durations for one or more stations;
   outputting, by the irrigation controller, a control signal corresponding to the execution of the irrigation schedule indicating that a first irrigation station of a plurality of irrigation stations is to be activated;
   receiving, at a transmitter unit coupled to the irrigation controller, an indication that the irrigation controller has activated the first irrigation station,
      wherein the transmitter unit is programmed such that the first irrigation station of the plurality of irrigation stations is associated with a first one or more wireless receiver units located remotely from the transmitter unit, and programmed such that a second irrigation station of the plurality of irrigation stations is associated with a second one or more wireless receiver units located remotely from the transmitter unit; and
   transmitting, by the transmitter unit and responsive to the indication, a wireless activation signal, configured for receipt at the first one or more wireless receiver units, wherein each of the first one or more wireless receiver units is coupled to an actuator and an actuatable device.

2. The method of claim 1 wherein the actuatable device comprises an irrigation valve controlling the flow of water therethrough.

3. The method of claim 1 wherein the transmitter unit comprises a connector comprising a power connection configured to be coupled to the irrigation controller to receive operational power.

4. The method of claim 1 wherein the irrigation controller is contained within a first housing and the transmitter unit is contained within a second housing separate from the first housing.

5. The method of claim 1 further comprising:
   receiving, at a signal receiver of one of the first one or more wireless receiver units, the wireless activation signal from the transmitter unit;
   receiving, at a first controller coupled to the signal receiver, a message contained in the wireless activation signal; and
   causing, responsive to the message, an activation circuit coupled to the first controller to output signaling; and
   causing, responsive to the output signaling, the actuator to actuate the actuatable device.

6. The method of claim 5 wherein the actuatable device comprises an irrigation valve controlling the flow of water therethrough.

7. The method of claim 5 further comprising:
   receiving the wireless activation signal at one or more additional wireless receiver units of the first one or more wireless receiver units, each configured to be coupled to an additional actuator coupled to an additional actuatable device, the additional actuator configured to actuate the additional actuatable device; and
   causing, at each of the one or more additional wireless receiver units and in response to the receiving, the additional actuator to actuate the additional actuatable device.

8. The method of claim 1 wherein the transmitter unit comprises a connector coupled to the irrigation controller, wherein the connector comprises an input connector configured to be coupled by wireline to an output connector of the irrigation controller.

9. The method of claim 1 wherein the transmitter unit comprises a connector coupled to the irrigation controller, wherein the connector comprises an input connector configured to be coupled to one or more station actuation output connectors of the irrigation controller.

10. The method of claim 1, wherein the transmitter unit has a user interface comprising one or more user inputs.

11. The method of claim 10 wherein the one or more user inputs comprise one or more buttons.

12. The method of claim 10 further comprising changing an operational state of the transmitter unit when the one or more user inputs are manipulated by a user.

13. The method of claim 10 wherein the user interface further comprises a display screen.

14. The method of claim 1, wherein the transmitter unit is a module detachably coupled to the irrigation controller.

15. The method of claim 1, further comprising receiving, at the irrigation controller, a signal from a second irrigation controller causing the irrigation controller to activate the first irrigation station.

16. The method of claim 15, wherein the second irrigation controller comprises a handheld controller.

17. The method of claim 15, wherein the second irrigation controller comprises a central controller.

18. A method for use in controlling irrigation comprising:
   coupling a transmitter unit with an irrigation controller, wherein the transmitter unit is a module detachably coupled to the irrigation controller;
   receiving, at a first controller of the transmitter unit through a connector configured to be coupled to the irrigation controller, an indication that an irrigation controller has activated an irrigation station;
   receiving, at the first controller through a user interface comprising at least one user input of the transmitter unit, at least one user input, wherein the transmitter unit is programmed such that a first irrigation station of a plurality of irrigation stations is associated with a first one or more wireless receiver units located remotely from the transmitter unit, and programmed such that a second irrigation station of the plurality of irrigation stations is associated with a second one or more wireless receiver units located remotely from the transmitter unit; and transmitting, by the transmitter unit and responsive to the indication, wireless activation signal configured to be received by a first one or more wireless receiver units, wherein each of the first one or more wireless receiver units is coupled to an actuator and an actuatable device, the actuator configured to actuate the actuatable device, the first one or more wireless receiver units each configured to cause the actuator to actuate a corresponding irrigation valve in response to receiving the wireless activation signal.

19. The method of claim 18 wherein the at least one user input is received at the first controller via a user interface comprising a display screen.

20. The method of claim 18, further comprising receiving, at the irrigation controller, a signal from a second irrigation controller causing the irrigation controller to activate the irrigation station, wherein the second irrigation controller comprises a central controller and a handheld controller.

* * * * *

UNITED STATES PATENT AND TRADEMARK OFFICE
CERTIFICATE OF CORRECTION

PATENT NO. : 10,863,682 B2
APPLICATION NO. : 16/229596
DATED : December 15, 2020
INVENTOR(S) : Mark M. Ensworth et al.

It is certified that error appears in the above-identified patent and that said Letters Patent is hereby corrected as shown below:

In the Claims

Claim 1, Column 33, Line 46, delete "signal," and insert -- signal --, therefor.

Claim 18, Column 34, Lines 57-59, delete "controller through a user interface comprising at least one user input of the transmitter unit," and insert -- controller, --, therefor.

Claim 18, Column 35, Line 2, after "indication," insert -- a --.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*